United States Patent
Kantarjiev et al.

(10) Patent No.: US 7,792,712 B2
(45) Date of Patent: Sep. 7, 2010

(54) TECHNIQUES FOR PROCESSING CUSTOMER SERVICE TRANSACTIONS AT CUSTOMER SITE USING MOBILE COMPUTING DEVICE

(75) Inventors: Christopher Kantarjiev, Palo Alto, CA (US); Shankar Unni, Campbell, CA (US); Louis H. Borders, Palo Alto, CA (US)

(73) Assignee: IpVenture, Inc., Los Altos, CA (US)

( * ) Notice: Subject to any disclaimer, the term of this patent is extended or adjusted under 35 U.S.C. 154(b) by 365 days.

(21) Appl. No.: 11/244,627

(22) Filed: Oct. 5, 2005

(65) Prior Publication Data

US 2006/0085250 A1   Apr. 20, 2006

Related U.S. Application Data

(63) Continuation of application No. 09/568,572, filed on May 10, 2000, now Pat. No. 6,975,937.

(60) Provisional application No. 60/133,646, filed on May 11, 1999.

(51) Int. Cl.
G06Q 10/00 (2006.01)
G06G 1/14 (2006.01)
G06Q 30/00 (2006.01)
G08G 1/123 (2006.01)

(52) U.S. Cl. ............... 705/28; 705/22; 705/26; 340/990; 340/993; 340/994

(58) Field of Classification Search ............. 705/22–28; 384/115, 119; 340/990–994
See application file for complete search history.

(56) References Cited

U.S. PATENT DOCUMENTS

| 2,781,643 | A | 2/1957 | Fairweather |
| 3,406,532 | A | 10/1968 | Rownd et al. |
| 3,670,867 | A | 6/1972 | Traube |
| 4,213,310 | A | 7/1980 | Buss |
| 4,455,453 | A | 6/1984 | Parasekvakos et al. |

(Continued)

FOREIGN PATENT DOCUMENTS

EP  0 425 405 A2  5/1991

(Continued)

OTHER PUBLICATIONS

Rachel Parker, USP Pioneers a cellular data network, Jun. 8, 1992, InforWorld, ABI/INORM Global, p. S59.*

(Continued)

*Primary Examiner*—Matthew S Gart
*Assistant Examiner*—Ig T An

(57) ABSTRACT

Techniques are described for facilitating delivery and adjustments of customer orders at a customer delivery site. A delivery courier is assigned a mobile field computing device for facilitating delivery and order adjustments of customer orders associated with that courier's delivery route. The mobile field computing device includes memory for storing customer order history data and delivery route data downloaded from a server system. The delivery route data stored in the mobile field computing device may be used by the delivery courier to facilitate delivery of the customer orders. Further, the delivery courier may use the mobile field computing device to process a variety of different order adjustment transactions at a customer delivery site.

43 Claims, 7 Drawing Sheets

U.S. PATENT DOCUMENTS

| | | | |
|---|---|---|---|
| 4,530,067 A | 7/1985 | Dorr | |
| 4,656,591 A | 4/1987 | Goldberg | |
| 4,799,156 A | 1/1989 | Shavit et al. | |
| 4,803,348 A | 2/1989 | Lohrey et al. | |
| 4,823,984 A | 4/1989 | Ficken | |
| 4,887,208 A | 12/1989 | Schneider et al. | |
| 4,936,738 A | 6/1990 | Brennan | |
| 4,958,280 A | 9/1990 | Pauly et al. | |
| 5,038,283 A | 8/1991 | Caveney | |
| 5,093,794 A | 3/1992 | Howie et al. | |
| 5,101,352 A | 3/1992 | Rembert | |
| 5,105,627 A | 4/1992 | Kurita | |
| 5,113,349 A | 5/1992 | Nakamura et al. | |
| 5,122,959 A * | 6/1992 | Nathanson et al. | 340/993 |
| 5,235,819 A | 8/1993 | Bruce | |
| 5,237,158 A | 8/1993 | Kern et al. | |
| 5,246,332 A | 9/1993 | Bernard | |
| 5,265,006 A | 11/1993 | Asthana | |
| 5,272,638 A | 12/1993 | Martin et al. | |
| 5,273,392 A | 12/1993 | Bernard | |
| 5,322,406 A | 6/1994 | Pippin et al. | |
| 5,334,824 A | 8/1994 | Martinez | |
| 5,362,948 A | 11/1994 | Morimoto | |
| 5,363,310 A | 11/1994 | Ahmadi et al. | |
| 5,395,206 A | 3/1995 | Cerny, Jr. | |
| 5,428,546 A | 6/1995 | Shah et al. | |
| 5,434,394 A | 7/1995 | Roach et al. | |
| 5,450,317 A | 9/1995 | Lu et al. | |
| 5,479,530 A * | 12/1995 | Nair et al. | 382/119 |
| 5,533,361 A | 7/1996 | Halpern | |
| 5,535,407 A | 7/1996 | Yanagawa et al. | |
| 5,548,518 A | 8/1996 | Dietrich et al. | |
| 5,553,312 A | 9/1996 | Gattey et al. | |
| 5,568,393 A | 10/1996 | Ando et al. | |
| 5,592,378 A | 1/1997 | Cameron et al. | |
| 5,593,269 A | 1/1997 | Bernard | |
| 5,598,487 A | 1/1997 | Hacker et al. | |
| 5,615,121 A | 3/1997 | Babayev et al. | |
| 5,640,002 A | 6/1997 | Ruppert et al. | |
| 5,664,110 A | 9/1997 | Green et al. | |
| 5,666,493 A | 9/1997 | Wojcik et al. | |
| 5,687,322 A | 11/1997 | Deaton et al. | |
| 5,694,551 A | 12/1997 | Doyle et al. | |
| 5,710,887 A | 1/1998 | Chelliah et al. | |
| 5,712,989 A | 1/1998 | Johnson et al. | |
| 5,758,313 A * | 5/1998 | Shah et al. | 340/990 |
| 5,758,328 A | 5/1998 | Giovannoli | |
| 5,758,329 A | 5/1998 | Wojcik et al. | |
| 5,761,673 A | 6/1998 | Bookman et al. | |
| 5,768,139 A | 6/1998 | Pippin et al. | |
| H1743 H | 8/1998 | Graves et al. | |
| 5,809,479 A | 9/1998 | Martin et al. | |
| 5,816,725 A | 10/1998 | Sherman et al. | |
| 5,826,242 A | 10/1998 | Montulli | |
| 5,826,825 A | 10/1998 | Gabriet | |
| 5,831,860 A | 11/1998 | Foladare et al. | |
| 5,832,457 A | 11/1998 | O'Brien et al. | |
| 5,834,753 A | 11/1998 | Danielson et al. | |
| 5,835,914 A | 11/1998 | Brim | |
| 5,839,117 A | 11/1998 | Cameron et al. | |
| 5,848,395 A | 12/1998 | Edgar et al. | |
| 5,878,401 A | 3/1999 | Joseph | |
| 5,880,443 A | 3/1999 | McDonald et al. | |
| 5,884,216 A * | 3/1999 | Shah et al. | 701/207 |
| 5,893,076 A | 4/1999 | Hafner et al. | |
| 5,894,554 A | 4/1999 | Lowery et al. | |
| 5,897,622 A | 4/1999 | Blinn et al. | |
| 5,897,629 A | 4/1999 | Shinagawa et al. | |
| 5,899,088 A | 5/1999 | Purdum | |
| 5,910,896 A * | 6/1999 | Hahn-Carlson | 700/231 |
| 5,918,213 A | 6/1999 | Bernard et al. | |
| 5,922,040 A | 7/1999 | Prabhakaran | |
| 5,943,652 A | 8/1999 | Sisley et al. | |
| 5,943,841 A | 8/1999 | Wunscher | |
| 5,949,776 A | 9/1999 | Mahany et al. | |
| 5,956,709 A | 9/1999 | Xue | |
| 5,960,411 A | 9/1999 | Hartman et al. | |
| 5,961,601 A | 10/1999 | Iyengar | |
| 5,963,919 A | 10/1999 | Brinkley et al. | |
| 5,974,401 A | 10/1999 | Enomoto et al. | |
| 5,979,757 A | 11/1999 | Tracy et al. | |
| 5,983,200 A | 11/1999 | Slotznick | |
| 5,987,377 A | 11/1999 | Westerlage et al. | |
| 5,991,739 A | 11/1999 | Cupps et al. | |
| 5,999,914 A | 12/1999 | Blinn et al. | |
| 6,003,015 A | 12/1999 | Kang et al. | |
| 6,006,100 A | 12/1999 | Koenck et al. | |
| 6,016,504 A | 1/2000 | Arnold et al. | |
| 6,023,683 A | 2/2000 | Johnson et al. | |
| 6,026,378 A | 2/2000 | Onozaki | |
| 6,058,417 A | 5/2000 | Hess et al. | |
| 6,061,607 A | 5/2000 | Bradley et al. | |
| 6,070,147 A | 5/2000 | Harms et al. | |
| 6,073,108 A | 6/2000 | Peterson | |
| 6,081,789 A | 6/2000 | Purcell | |
| 6,083,279 A | 7/2000 | Cuomo et al. | |
| 6,084,528 A | 7/2000 | Beach et al. | |
| 6,085,170 A | 7/2000 | Tsukuda | |
| 6,087,952 A | 7/2000 | Prabhakaran | |
| 6,088,648 A * | 7/2000 | Shah et al. | 701/117 |
| 6,094,642 A | 7/2000 | Stephenson et al. | |
| 6,101,481 A | 8/2000 | Miller | |
| 6,101,486 A | 8/2000 | Roberts et al. | |
| 6,123,259 A | 9/2000 | Ogasawara | |
| 6,140,922 A | 10/2000 | Kakou | |
| 6,144,848 A | 11/2000 | Walsh et al. | |
| 6,157,945 A | 12/2000 | Balma et al. | |
| 6,167,380 A | 12/2000 | Kennedy et al. | |
| 6,167,382 A | 12/2000 | Sparks et al. | |
| 6,178,510 B1 | 1/2001 | O'Connor et al. | |
| 6,182,053 B1 | 1/2001 | Rauber et al. | |
| 6,185,625 B1 | 2/2001 | Tso et al. | |
| 6,215,952 B1 | 4/2001 | Yoshio et al. | |
| 6,233,543 B1 | 5/2001 | Butts et al. | |
| 6,236,974 B1 | 5/2001 | Kolawa et al. | |
| 6,249,773 B1 | 6/2001 | Allard | |
| 6,249,801 B1 | 6/2001 | Zisapel et al. | |
| 6,260,024 B1 | 7/2001 | Shkedy | |
| 6,275,812 B1 | 8/2001 | Haq et al. | |
| 6,289,260 B1 | 9/2001 | Bradley et al. | |
| 6,289,370 B1 | 9/2001 | Panarello et al. | |
| 6,292,784 B1 | 9/2001 | Martin et al. | |
| 6,324,520 B1 | 11/2001 | Walker et al. | |
| 6,332,334 B1 | 12/2001 | Faryabi | |
| 6,341,269 B1 | 1/2002 | Dulaney et al. | |
| 6,343,275 B1 | 1/2002 | Wong | |
| 6,397,246 B1 | 5/2002 | Wolfe | |
| 6,405,173 B1 | 6/2002 | Honarvar et al. | |
| 6,424,947 B1 | 7/2002 | Tsuria et al. | |
| 6,438,652 B1 | 8/2002 | Jordan et al. | |
| 6,445,976 B1 | 9/2002 | Ostro | |
| 6,453,306 B1 | 9/2002 | Quelene | |
| 6,463,345 B1 | 10/2002 | Peachey-Kountz et al. | |
| 6,463,420 B1 | 10/2002 | Guidice et al. | |
| 6,484,150 B1 | 11/2002 | Blinn et al. | |
| 6,490,567 B1 | 12/2002 | Gregory | |
| 6,496,205 B1 | 12/2002 | White et al. | |
| 6,505,093 B1 | 1/2003 | Thatcher et al. | |
| 6,505,171 B1 | 1/2003 | Cohen et al. | |
| 6,526,392 B1 | 2/2003 | Dietrich et al. | |
| 6,530,518 B1 | 3/2003 | Krichilsky et al. | |
| 6,549,891 B1 | 4/2003 | Rauber et al. | |
| 6,567,786 B1 | 5/2003 | Bibelnieks et al. | |
| 6,571,213 B1 | 5/2003 | Altendahl et al. | |

| | | |
|---|---|---|
| 6,578,005 B1 | 6/2003 | Lesaint et al. |
| 6,587,827 B1 | 7/2003 | Hennig et al. |
| 6,594,692 B1 | 7/2003 | Reisman |
| 6,598,024 B1 | 7/2003 | Walker et al. |
| 6,598,027 B1 | 7/2003 | Breen, Jr. |
| 6,622,127 B1 * | 9/2003 | Klots et al. ............ 705/28 |
| 6,654,726 B1 | 11/2003 | Hanzek |
| 6,697,964 B1 | 2/2004 | Dodrill et al. |
| 6,741,995 B1 | 5/2004 | Chen et al. |
| 6,748,318 B1 | 6/2004 | Jones |
| 6,748,418 B1 | 6/2004 | Yoshida et al. |
| 6,763,496 B1 | 7/2004 | Hennings et al. |
| 6,792,459 B2 | 9/2004 | Elnozahy et al. |
| 6,862,572 B1 | 3/2005 | de Sylva |
| 6,873,970 B2 | 3/2005 | Showghi et al. |
| 6,879,965 B2 | 4/2005 | Fung et al. |
| 6,904,455 B1 | 6/2005 | Yen |
| 6,970,837 B1 | 11/2005 | Walker et al. |
| 6,980,962 B1 | 12/2005 | Arganbright et al. |
| 6,990,460 B2 | 1/2006 | Parkinson |
| 7,010,501 B1 | 3/2006 | Roslak et al. |
| 7,028,187 B1 | 4/2006 | Rosen |
| 7,035,914 B1 | 4/2006 | Payne et al. |
| 7,040,541 B2 | 5/2006 | Swartz et al. |
| 7,085,729 B1 | 8/2006 | Kennedy et al. |
| 7,139,721 B2 * | 11/2006 | Borders et al. ............ 705/9 |
| 7,177,825 B1 | 2/2007 | Borders et al. |
| 7,197,547 B1 | 3/2007 | Miller et al. |
| 7,222,161 B2 | 5/2007 | Yen et al. |
| 7,233,914 B1 | 6/2007 | Wijaya et al. |
| 7,240,283 B1 | 7/2007 | Paila et al. |
| 7,251,612 B1 | 7/2007 | Parker et al. |
| 7,308,423 B1 | 12/2007 | Woodward et al. |
| 7,346,564 B1 | 3/2008 | Kirklin et al. |
| 7,370,005 B1 | 5/2008 | Ham et al. |
| 7,383,233 B1 | 6/2008 | Singh et al. |
| 2001/0013007 A1 | 8/2001 | Tsukuda |
| 2001/0037229 A1 | 11/2001 | Jacobs et al. |
| 2001/0042021 A1 | 11/2001 | Matsuo et al. |
| 2001/0042050 A1 | 11/2001 | Fletcher et al. |
| 2001/0047285 A1 | 11/2001 | Borders et al. |
| 2001/0047310 A1 | 11/2001 | Russell |
| 2001/0049619 A1 | 12/2001 | Powell et al. |
| 2001/0049672 A1 | 12/2001 | Moore |
| 2002/0002513 A1 | 1/2002 | Chiasson |
| 2002/0004766 A1 | 1/2002 | White |
| 2002/0007299 A1 | 1/2002 | Florence |
| 2002/0010633 A1 | 1/2002 | Brotherson |
| 2002/0013950 A1 | 1/2002 | Tomsen |
| 2002/0038224 A1 | 3/2002 | Bhadra |
| 2002/0038261 A1 | 3/2002 | Kragman et al. |
| 2002/0049853 A1 | 4/2002 | Chu et al. |
| 2002/0050526 A1 | 5/2002 | Swartz et al. |
| 2002/0065700 A1 | 5/2002 | Powell et al. |
| 2002/0072994 A1 * | 6/2002 | Mori et al. ............ 705/26 |
| 2002/0103724 A1 | 8/2002 | Huxter |
| 2002/0188530 A1 | 12/2002 | Wojcik et al. |
| 2002/0194084 A1 | 12/2002 | Suries |
| 2002/0194087 A1 | 12/2002 | Spiegel et al. |
| 2003/0045340 A1 | 3/2003 | Roberts |
| 2003/0065565 A1 | 4/2003 | Wagner et al. |
| 2003/0079227 A1 | 4/2003 | Knowles et al. |
| 2003/0119485 A1 | 6/2003 | Ogasawara |
| 2003/0233190 A1 | 12/2003 | Jones |
| 2004/0107125 A1 | 6/2004 | Guheen et al. |
| 2004/0236635 A1 | 11/2004 | Publicover |
| 2005/0027580 A1 | 2/2005 | Crici et al. |
| 2005/0144641 A1 | 6/2005 | Lewis |
| 2005/0261985 A1 | 11/2005 | Miller et al. |
| 2006/0142895 A1 | 6/2006 | Waddington et al. |
| 2007/0016463 A1 | 1/2007 | Borders et al. |
| 2007/0174144 A1 | 2/2007 | Borders et al. |
| 2007/0055580 A1 | 3/2007 | Woodward et al. |
| 2007/0112647 A1 | 5/2007 | Borders et al. |
| 2007/0136149 A1 | 6/2007 | Woodward et al. |
| 2007/0162353 A1 | 7/2007 | Borders et al. |
| 2007/0250572 A1 | 10/2007 | Narasimha et al. |
| 2008/0015959 A1 | 1/2008 | Kruglikov et al. |
| 2008/0154709 A1 | 6/2008 | Ham et al. |

FOREIGN PATENT DOCUMENTS

| | | |
|---|---|---|
| FR | 2696722 | 4/1994 |
| GB | 2 265 032 A | 9/1993 |
| WO | WO99/07121 | 2/1999 |
| WO | WO9909508 * | 2/1999 |

OTHER PUBLICATIONS

Rachel Parker, UPS pioneers a cellular data network, Jun. 8, 1992; Infoworld, p. S59.*

Thomas Hoffman, New UPS CIO eyes cyberdelivery, Nov. 11, 1996, Computerworld, p. 4.*

Imposing an objective viewpoint, Mar. 1994, Modern purchasing, vol. 36, Iss 3, p. 9.*

New medium, new message, Oct. 23, 1993, The Economist, vol. 329, Iss7834, p. S16, 3 pgs.*

"Peapod Interactive Grocery Shopping and Delivery Service Now Delivers Via the Internet", Press Release, peapod.com, Apr. 22, 1996, pp. 1-2.

www.peapod.com, including Introduction to Peapod; How Peapod Works; Peapod: Choosing a Delivery Time; Peapod: Sending Your Order; Retrieved from internet Archive (web.archive.org) on Jul. 23, 2006, alleged date Nov. 13, 1996, pp. 1-9.

Norton, Tim R., "End-To-End Response-Time: Where to Measure?", Computer Measurement Group Conference Proceedings, CMG99 Session 423, Dec. 1999, pp. 1-9.

Fielding et al., "Hypertext Transfer Protocol—HTTP/1.1, RFC 2616", Network Working Group, Jun. 1999, pp. 1-90.

Hyten, Todd, "Stop & Shop mulls online grocery store", Boston Business Journal (Boston, MA, US), vol. 16, No. 6, p. 1, Mar. 22, 1996.

Pearce, Michael R. "From carts to clicks", Ivey Business Quarterly, v63nI, p. 69-71, Autumn 1998.

Worth Wren Jr., Fort Worth Star-Telegram Texas, "Albertson's Expects Online Grocery Shopping To Boom", KRTBN Knight-Ridder Tribune Business News (Fort Worth Star-Telegram, Texas), Nov. 9, 1998.

Jaffe, Charles A. "Gas supplier takes timing seriously if deliveries are late, the product is free," The Morning Call, Allentown, PA, Feb. 5, 1989, pp. 1-4.

U.S. Appl. No. 11/818,010, filed Jun. 13, 2007.
U.S. Appl. No. 12/074,283, filed Mar. 3, 2008.
U.S. Appl. No. 09/568,613, filed May 10, 2000.
U.S. Appl. No. 09/568,614, filed May 10, 2000.

Anon, Automatic ID News, "20/20 Results Achieved with Technology Trio", Sep. 1995, p. 19.

Anon, PC Foods, "Customer Service Agreement," printed from website: http://www.pcfoods.com, Abstract No., XP-002245026, 1999, pp. 1-2.

Anupindi et al., "Estimation of Consumer Demand with Stock-Out Based Substitution: An Application to Vending Machine Product", Marketing Science, vol. 17, No. 4, 1998, pp. 406-423.

Fynes, Brian, et al, The Impact of Electronic Data Interchange on Competitiveness in Retail Supply Chain, IBAR vol. 14 No. 2, 1993, pp. 16-2.

Kawata, Hiroo, "Information Technology of Commercial Vehicles in the Japanese Parcel Service Business," Abstract No. XP-000560489, 1992, pp. 371-382.

Koster, Rene de, "Routing Orderpickers in a Warehouse: A Comparison Between Optimal and Heuristic Solutions," IIE Transactions, vol. 30, No. 5, May 1998, p. 469.

Maloney, David, "The New Corner Drugstore", Modern Materials Handling, vol. 55, No. 5, May 1, 2000, p. 58.

Sekita, Takashi, "The Physical Distribution Information Network in the Home-Delivery Business," Japan Computer Quarterly, Abstract No. XP-00.431194, 1990, pp. 23-32.

Smith et al., "Management of Multi-Item Retail Inventory Systems with Demand Substitution", Operations Research, vol. 48, No. 1, Jan.-Feb. 2000, pp. 50-64.

Towie, Henry, "On the Fast Track with Totaltracks: UPS Deploys Mobile Date Service," Abstract No. XP-000560076, Document Delivery World, vol. 9, No. 3, 1993, pp. 30-31.

Van Den Berg, Jeroen, P, "A Literature Survey on Planning and Control of Warehousing Systems", IIE Transactions vol. 31, No. 3, Aug. 1999, p. 751.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Wunnava et al., "Interactive Multimedia on the World Wide Web", IEEE, Aug. 1999, pp. 110-115.

Booker, et al. "Up in the air", Computerworld, Oct. 11, 1993; 27, 41; ABI/INFORM Global, p. 54.

Hoffman, Thomas, "New UPS CIO eyes cyberdelivery," Computerworld, Nov. 11, 1996, 30, 46; ABI/INFORM Global, p. 4.

"Imposing an Objective Viewpoint," Modem Purchasing, vol. 38, Iss. 3, Mar. 1994, pp. 1-4.

"New Medium, new message," The Economist, vol. 329, Iss. 7834, Oct. 23, 1993, p. S 16, pp. 1-5.

Dialog Examiner's search, re: U.S. Appl. No. 11/244,627, dated Sep. 24, 2009, 16 pages.

Dialog Examiner's search, re: U.S. Appl. No. 11/244,627, dated Nov. 24, 2009, 2 pages.

Dialog Examiner's search, re: U.S. Appl. No. 11/244,627, dated Nov. 24, 2009, 13 pages.

Complaint for Patent infringement, Case 1:09-cv-06870, flied Oct. 30, 2009, pp. 1-5.

Answer to Complaint With Affirmative Defenses and Counterclaims, Case 1:09-cv-08870, filed Dec. 23, 2009, pp. 1-9.

Alba et al., "Interactive home shopping: Consumer, retailer, and manufacturer incentives to participate in electronic marketplaces", Journal of Marketing, vol. 61, No. 3, Jul. 1, 1997, 18 pgs.

Brown Janelle, "Pod People Peapod, the online grocery service, sounds great—but can it deliver?" Salon Media Group, Inc., Dec. 17, 1998, 3 pages.

Corcoran, Cathy, "The Skeptic's Guide to on-line shopping. Who has time to shop for groceries? So we gave Peapod a test run." The Patriot Ledger, Quincy, MA, Jul. 7, 1997, 4 pages.

Descartes Licenses Energy V6 Supply Chain Suite to Major Pepsi Bottler . . . News Release, Descartes Systems Group Inc., Waterloo Ontario, Aug. 27, 1998, 2 pages.

Dilger, Karen Abramic, "Warehouse Wonders", Manufacturing Systems, vol. 15, No. 2, Feb. 1, 1997, 4 pages.

Dyson et al., "Electronic Delivery without the Internet (Digital Delivery of Newspapers)", The Seybold Report on Publishing Systems, vol. 25, No. 1, ISBN: 0736-7260, Sep. 1, 1995, 9 pages.

Eckerson, Wayne, "Grocers put stock in EDI to streamline deliveries; New electronic data interchange systems offer a wealth of benefits for retailers and suppliers," Network World, Inc., Aug. 7, 1989, 2 pages.

First Stop—Main Menu, website tour, Peapod, http://web.archive.org/web/19961113150913/www.peapod.com/tour1 .html, Nov. 13, 1996, 13 pages.

Frequently Asked Questions, webpages, Peapod, http://web.archive.org/web/19961113150832/www.peapod.com/question.html, Nov. 13, 1996, 2 pages.

Purpura, Linda, "Getting to House from Order Smooth Transitions from Order, To Pick, To Pack, To Delivery, are a Vital Part of a Successful Home-Shopping Program", Supermarket News, Oct. 6, 1997, 2 pages.

Reynolds, Janice, "Logistics and Fulfillment for E-Business", ISBN: 1-57820074-1, 2001, 60 pages.

"Shopping-Virtually Hassle-Free", Computer Weekly, Apr. 10, 1997, 2 pages.

Smart Shopping for Busy People, webpage, Peapod, http://web.archive.org/web/19961113145048/www.peapod.com/ Nov. 11, 1996, 1 page.

User Manual, Peapod, Inc., Version 3.10, Aug. 7, 1992, 83 pages.

Van Mieghem, Jan A., "Peapod: Mass Customized Service", Kellogg School of Management, Northwestern University, Aug. 28, 2001 (Rev. Nov. 22, 2004), 13 pages.

Peapod's Initial Non-Infringement and Invalidity Contention under LPR 2.3, Case 1:09-cv-06870, filed Feb. 3, 2010, pp. 1-45.

Initial Non-Infringement Contentions, re: U.S. Patent No. 6,975,937, Exhibit A, Case 1:09-cv-06870, filed Feb. 3, 2010, pp. 1-24.

Initial Non-Infringement Contentions, re: U.S. Patent No. 7,233,914, Exhibit B, Case 1:09-cv-06870, filed Feb. 3, 2010, pp. 1-12.

Invalidity Claim Chart for U.S. Patent No. 6,975,937, Exhibit C, Case 1:09-cv-06870, filed Feb. 3, 2010, pp. 1-30.

Invalidity Claim Chart for U.S. Patent No. 7,233,914, Exhibit D, Case 1:09-cv-06870, filed Feb. 3, 2010, pp. 1-6.

Invalidity Claim Chart for U.S. Patent No. 7,233,914, Exhibit E, Case 1:09-cv-06870, filed Feb. 3, 2010, pp. 1-9.

Delivery Solutions, Inc.'s and IPVenture, Inc.'s Initial Response to Peapod's LPR 2.3 Invalidity Contentions, Case 1:09-cv-06870, filed Feb. 17, 2010, pp. 1-58.

Numetrix Unveils xtr@; an Internet-Designed Solution for Real-Time Supply Chain Collaboration, Business/Technology Editors, Business Wire, New York: Dec. 16, 1998, pp. 1-4.

Office Action for U.S. Appl. No. 09/568,572 dated Feb. 20, 2003.

Office Action for U.S. Appl. No. 09/568,572 dated Jul. 29, 2003.

Advisory Action for U.S. Appl. No. 09/568,572 dated Nov. 20, 2003.

Office Action for U.S. Appl. No. 09/568,572 dated Mar. 23, 2004.

Notice of Allowance for U.S. Appl. No. 09/568,572 dated Oct. 6, 2004.

Office Action for U.S. Appl. No. 09/568,572 dated Apr. 7, 2005.

Notice of Allowance for U.S. Appl. No. 09/568,572 dated Aug. 10, 2005.

Notice of Allowance for U.S. Appl. No. 09/568,572 dated Oct. 17, 2005.

Bloch et al., "On the Road of Electronic Commerce—a Business Value Framework, Gaining Competitive Advantage and Some Research Issues", Mar. 1996, 20 pages.

"Here's How Peapod Works," webpages, Peapod, http://web.archive.org/web/19961113151243/www.peapod.com/work.html, Nov. 13, 1996, 2 pages.

"Installation and Shopping Tips for the Mac," Peapod Video, 1993, 1 page.

"Introduction to Peapod," webpages, Peapod, http://web.archive.org/web/19961113145506/www.peapod.com/intro.html, Nov. 13, 1996, 2 pages.

Ives et al., "The Information System as a Competitive Weapon", Communications of the ACM, vol. 27, No. 12, Dec. 1984. 9 pages.

Maeglin, Kathy, "Services Take the 'Shop' Out of Shopping for Groceries", The Capital Times, Mar. 20, 1997, 2 pages.

Mai et al., "Consumers' Perceptions of Specialty Foods and the Rural Mail Order Business", 52nd EAAE Seminar—Parma, Jun. 19-21, 1997, pp. 331-348.

Malone et al., "Computers, Networks, and the Corporation," Center for Information Systems Research, MIT, Aug. 1991, 14 pages.

Marsh, Barbara, "Peapod's On-Line Grocery Service Checks Out Success—Customers Shop Electronic Aisles; Finicky Workers Sack the Goods", The Wall Street Journal, Jun. 30, 1994, 2 pages.

Meeker et al., The Internet Retailing Report, U.S. Investment Research, Morgan Stanley, May 28, 1997, 241 pages.

Menzies, David, "Checking out the aisles by computer: Cori Bonina, General Manager of Stong's market in Vancouver, has made a virtual success of a meat-and-potatoes business", National Post, Dec. 1, 1998, 2 pages.

"More Information," webpages, Peapod http://web.archive.org/web/19961113145540/www.peapod.com/more.html, Nov. 13, 1996, 2 pages.

"Online Groceries, a Quicker Shopping Cart?" E-Commerce Customers—What, Where and Why They Buy, Standard Media Inc. and Odyssey, LP, Spring 2000, 19 pages.

Patterson, Rebecca H., "No Lines at Britain's First On-Line Grocery Store, but You Still May Wait", The Wall Street Journal Europe, Jul. 25, 1997, 3 pages.

Peapod, Inc., Telephone Grocery Shopping Guide, Aug. 7, 1992, 3 introductory pages and pp. 1-12.

Podmolik, Mary Ellen, "Groceries Seeing Green From Computer Shopping", Chicago Sun-Times, May 8, 1996, 1 page.

Poirier, Charles et al., Supply Chain Optimization, Building the Strongest Total Business Network, Berrett-Koehler Publishers, San Francisco, Copyright 1996, 30 pages.

* cited by examiner

TECHNIQUES FOR PROCESSING CUSTOMER SERVICE TRANSACTIONS AT CUSTOMER SITE USING MOBILE COMPUTING DEVICE

CROSS REFERENCE TO RELATED APPLICATIONS

This application is a continuation of U.S. patent application Ser. No. 09/568,572 entitled "TECHNIQUE FOR PROCESSING CUSTOMER SERVICE TRANSACTIONS AT CUSTOMER SITE USING MOBILE COMPUTING DEVICE," filed May 10, 2000, the entirety of which is incorporated herein by reference for all purposes, which claims priority under 35 USC 119(e) from U.S. Provisional Patent Application No. 60/133,646, entitled ELECTRONIC COMMERCE ENABLED DELIVERY SYSTEM AND METHOD, filed May 11, 1999, the entirety of which is incorporated herein by reference for all purposes.

The present application also relates to a number of U.S. patent applications filed in May 2000, including: U.S. patent application Ser. No. 09/568,603 for INTEGRATED SYSTEM FOR ORDERING, FULFILLMENT, AND DELIVERY OF CONSUMER PRODUCTS USING A DATA NETWORK; U.S. patent application Ser. No. 09/568,570 for INVENTORY REPLICATION BASED UPON ORDER FULFILLMENT RATES; U.S. patent application Ser. No. 09/568,614 for REAL-TIME DISPLAY OF AVAILABLE PRODUCTS OVER THE INTERNET; U.S. patent application Ser. No. 09/568,613 for SCHEDULING DELIVERY OF PRODUCTS VIA THE INTERNET; U.S. patent application Ser. No. 09/568,823 for LOAD BALANCING TECHNIQUE IMPLEMENTED IN A DATA NETWORK DEVICE UTILIZING A DATA CACHE; U.S. patent application Ser. No. 09/568,569, now U.S. Pat. No. 6,622,127 B1, for ORDER ALLOCATION TO SELECT FROM INVENTORY LOCATIONS STOCKING FEW UNITS OF INVENTORY; U.S. patent application Ser. No. 09/566,912, now U.S. Pat. No. 6,332,334 B1, for METHOD AND APPARATUS FOR HANDLING AND TRANSPORTING TEMPERATURE-SENSITIVE ITEMS; and U.S. patent application Ser. No. 09/568,571 for ORDER ALLOCATION TO MINIMIZE CONTAINER STOPS IN A DISTRIBUTION CENTER. Each of the disclosures of these copending applications is incorporated herein by reference in its entirety for all purposes.

BACKGROUND OF THE INVENTION

1. Field of the Invention

This invention relates to the field of electronic commerce. In particular, the present invention relates to a technique for delivering and modifying customer orders for consumer products using a data network.

2. Description of the Related Art

Companies have been delivering goods to customer homes for years using many different kinds of delivery systems. Examples run from mail order catalog shopping to on-line ordering and delivery services such as those provided by Amazon.com and Peapod.com. Indeed, the demand for home shopping and home delivery is increasing. However, many of the conventional systems which provide home shopping and home delivery services have significant limitations that prevent their adoption on a large scale basis.

Using conventional techniques, an on-line product purchasing transaction will typically include the following steps. First, the customer selects one or more products to be purchased. Once the customer has finished selecting the desired product(s), the customer may then proceed to a check-out or order confirmation page. During the check-out or order confirmation process, the customer provides the necessary information for completing the transaction purchase, such as, for example, the customer's name, credit card number, shipping address, etc. Before the order is confirmed by the on-line retailer, (e.g., Amazon.com), the billing and financial information is verified and processed. For example, if a credit card is used by the customer to purchase selected on-line products, a credit card transaction for the total amount of the purchase will be authorized before the purchase order is confirmed and fulfilled by the merchant. Once the payment transaction has been authorized, the on-line merchant typically fulfills the order by obtaining the purchased products, and shipping the purchased products the customer's shipping address using a common carrier (e.g. third-party courier) such as, for example, UPS, USPS, Federal Express, etc. The customer's credit card is typically billed at the time of shipment.

Although conventional on-line product purchasing techniques provide the convenience of allowing a customer to purchase and receive a desired product without having to venture outside his or her home, these techniques suffer from a number of disadvantages. For example, many on-line merchants provide adequate customer service relating to on-line product purchases, but typically provide inadequate customer service for handling returns or customer complaints. Further, once the customer's order has been processed, a customer typically does not have the ability to change, alter, or cancel the order. Rather, the customer must typically wait until he or she receives the originally ordered goods, and then must make a subsequent request to the on-line merchant for returning or modifying at least a part of the order. This latter request is typically handled as a separate transaction on the merchant's side, and may involve lengthy delays. Additionally, if the customer wishes to return one or more products, the customer is typically required by the merchant to first obtain a return authorization number (after first submitting a return request), and typically is responsible for paying shipping costs for shipping the returned products back to the merchant.

The following example may help to illustrate some of the potential problems which a customer may encounter when purchasing products via on-line retailers or merchants. First, let us assume that a customer has selected two books for purchase using an on-line merchant, such as, for example, Amazon.com. When the customer proceeds to the check-out page, the customer authorizes a total amount (i.e., for the books, tax, and shipping) to be billed to his or her credit card. Once the credit card authorization for the total amount has been received, the merchant fulfills the order and forwards the order to a common carrier for shipment. The customer's credit account will be billed at this time for the total amount specified above.

After the order has been fulfilled by the merchant, the customer is typically unable to modify or cancel the order. Thus, for example, if the customer subsequently wishes to cancel one of the ordered books after the merchant has fulfilled the order, the customer must first wait to receive the book, and then submit a separate request to the on-line merchant for returning the book. It is worth noting that since the purchased items are typically shipped using an independent courier service or common carrier such as UPS, Federal Express, or the U.S. postal service, there is no mechanism in place whereby the customer is able to return the undesired product (e.g., book) back to the delivery courier for an immediate refund. Rather, as is typically the case, the customer must first obtain a return authorization number from the merchant, re-package the unwanted product, and ship the unwanted product back to the merchant. Typically, the customer is required to pay for shipping charges for returning a product, even if the product was received in a defective condition.

Once the returned product is received by the merchant, it is typically processed within four to six weeks, meaning that a credit for the returned product may not be issued to the customer until four weeks after the product has been received by the merchant. In the example above, a credit, when issued, may appear as a refund or a credit on the customer's credit card account.

An additional problem with conventional on-line purchasing transactions relates to merchandise availability. For example, when a merchant receives a request for a product return, the merchant is not able to include the returned product as part of the merchant's current inventory until the returned product is physically received at the merchant's site and the return processed, which may take up to 4 to 6 weeks. Moreover, until the returned order is processed, the returned merchandise will typically not be included as part of the inventory made available for customer purchase. This results in an inefficient allocation of resources.

In light of the above, there exists a continual need to improve upon electronic commerce and on-line purchasing and delivery techniques.

SUMMARY OF THE INVENTION

According to the several embodiments of the present invention, techniques are described for facilitating delivery and adjustment of customer orders at one or more customer delivery sites. According to one embodiment, a delivery courier is assigned a mobile field computing device for facilitating delivery and order adjustments of customer orders associated with that courier's delivery route. The mobile field computing device can include memory for storing customer order history data and delivery route data downloaded from a server system. The delivery route data stored in the mobile field computing device may be used by the delivery courier to facilitate delivery of the customer orders. Further, the delivery courier may use the mobile field computing device to process a variety of different order adjustment transactions at a customer delivery site.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

The technique of the present invention provides a solution for facilitating delivery and adjustments of customer orders which may be performed by a delivery courier at a customer delivery site. According to at least one embodiment, each delivery courier is assigned a mobile field computing device (MFD Client) for facilitating delivery and order adjustments of customer orders associated with that courier's delivery route. Before being dispatched to commence his or her delivery run, the delivery courier may download customer order history data and delivery route data from an MFD Server into the courier's MFD Client device. The delivery route data stored in the MFD Client device may be used by the delivery courier to facilitate delivery of the customer orders. Further, the delivery courier may use the MFD Client device to process a variety of different order adjustment transactions (e.g. customer returns, order modifications, fees, credits, etc.) at a customer delivery site. The MFD Client device may be configured to use the stored customer order history data to process the order adjustment transactions. Additionally, the MFD Client device may further be configured to compute updated customer billing data based upon the processed order adjustment transactions. A modified receipt which includes the updated customer billing data may then be provided to the customer. In this way, the customer will know, at the time of delivery, all charges for which the customer will be billed and/or credited. Additionally the technique of the present invention may be used to track the status of customer orders and delivery resources such as, for example, delivery couriers and/or delivery vehicles.

Figure 1:
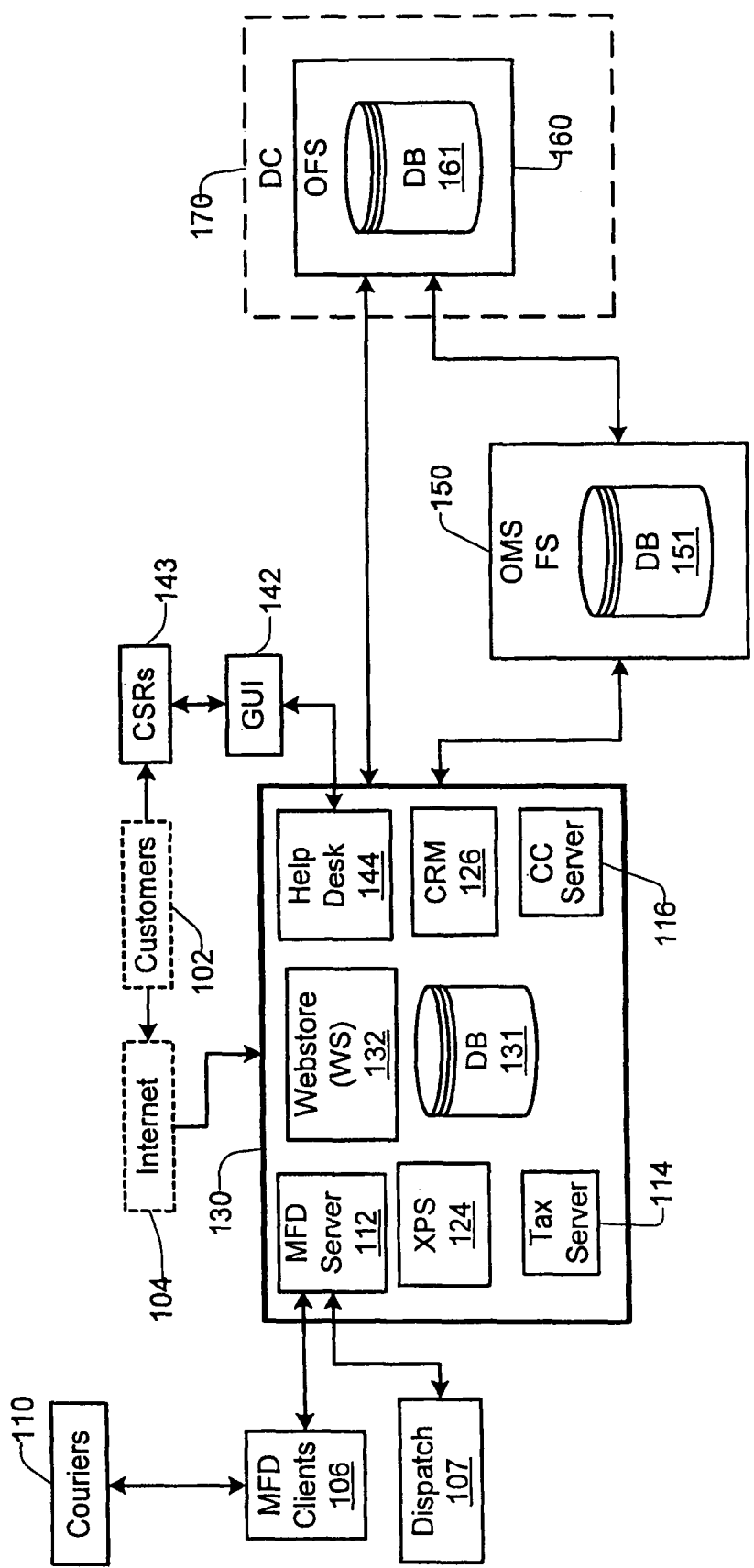
FIG. 1 shows a schematic block diagram of an integrated system architecture 100 in accordance with a specific embodiment of the present invention.

FIG. 1 shows a schematic block diagram illustrating various systems, subsystems and/or components of the integrated system architecture 100 in accordance with a specific embodiment of the present invention. As shown in FIG. 1, system 100 includes a plurality of subsystems and other components for effecting electronic commerce over a data network. A brief description of at least a portion of the plurality of subsystems of system 100 is presented below. For example, system 100 of FIG. 1 may include:

(1) a Webstore Subsystem (WS) 132 which manages the on-line store interface with customers, including customer shopping and ordering transactions;

(2) a Transportation Subsystem (XPS) 124 which manages delivery window scheduling, delivery vehicle routing, capacity planning, and mobile field device (MFD) data used by delivery couriers;

(3) an Order Management Subsystem (OMS) 150 which manages pricing data, item availability data, inventory data, vendor data, finance, procurement, etc;

(4) an Order Fulfillment Subsystem (OFS) 160 which facilitates the fulfillment of customer orders and manages the distribution center (170) operations;

(5) a Customer Relationship Management (CRM) Subsystem 126 for enabling customer service representatives (CSRs) 143 to service customer requests and track customer interaction; etc.

As shown in FIG. 1, system 100 may include at least a portion of the above-described subsystems. Additionally, each subsystem may also comprise at least one server and/or other components. Further, each subsystem may be configured to utilize a dedicated or shared database server as its persistent and transactional data backbone. Users or customers may access data stored on one of the subsystem's database servers (e.g. Webstore database), which then executes appropriate business logic and/or business objects.

Each subsystem may be configured or designed to communicate with each other via a plurality of interfaces. According to a specific embodiment, the plurality of interfaces includes both synchronous and asynchronous interfaces. Many of the various system interfaces are configured to be asynchronous, wherein data is typically transferred in batch mode via staging (e.g. database) tables or flat files (e.g., separated value files). However, at least a portion of the system interfaces are configured as synchronous interfaces. Generally, a synchronous interface may be used where an immediate response from a server or component is required. Synchronous interfaces in the system 100 of FIG. 1 may exist between the WS 132 and Tax Server 114, and MFD Server 112 and Tax Server 114, for example.

Conceptually, the system 100 of FIG. 1 may be grouped into two general subsystems, namely a Front Office system and a Back Office system. The Front Office system is generally responsible for functions related to customer transactions such as, for example, customer orders, billing transactions, delivery scheduling, customer service, etc. In the embodiment of FIG. 1, for example, the Front Office system 130 comprises the Webstore Subsystem 132, Transportation Subsystem 124, and Customer Relationship Management Subsystem 126. The Front Office system 130 may also include other subsystems or components such as, for example, a Mobile Field Device (MFD) Server 112, a tax component 114, a credit or debit card billing component 116, a Help Desk component 144, etc. The above-described subsystems and components of Front Office 130 are described in greater detail below.

Additionally, the Front Office system 130 may include a centralized database 131 which may be accessed by subsystems and/or components of system 100. Alternatively, one or more of the Front Office systems and/or components may each comprise a respective database which is accessible by other subsystems and/or components of system 100.

The Back Office system generally includes all subsystems and/or components which are not part of the Front Office system. Thus, as shown in FIG. 1, for example, the Back Office system includes the OMS 150 and OFS 160 subsystems. However, the invention is not limited to the particular embodiment shown in FIG. 1, and it will be appreciated that the specific configuration of system 100 may be modified by one having ordinary skill in the art to suit specific applications.

Subsystem Functionality

This section provides a more detailed description of the various subsystems and components which form the integrated system architecture of the present invention, as shown, for example, in FIG. 1 of the drawings.

Front Office Architectural Layers

As shown in FIG. 1, the Front Office system 130 comprises a plurality of separate subsystems such as, for example, Webstore Subsystem (WS) 132, Transportation Subsystem (XPS) 124, and Customer Relationship Management (CRM) Subsystem 126. Each subsystem may be implemented via a combination of hardware and/or software, and further may include a plurality of different functional components, modules, and/or plug-in applications.

At least a portion of the software residing at the Front Office system may include a presentation layer, an application layer, a business object layer, a database access layer, or any combination thereof. According to a specific embodiment, the presentation layer handles the actual presentation of information to users via an appropriate medium. The application layer, which may be stateless, handles the appropriate application logic for the various subsystems of the Front Office. For example, in the Webstore Subsystem 132, it is the application layer (referred to as the shopping engine) which determines that a customer cannot check out an order unless the customer has selected a delivery window, or provided billing information. The business object layer, which may be stateful, provides objects with a fixed set of functionality (e.g. methods or procedures) that may be manipulated by the application layer. The business object layer may also implement write through caching of data. According to a specific embodiment, the business objects do not know about each other, and the application layer handles the coordination between the various business objects. The database access layer provides connectivity and data access APIs to the Front Office database 131 (also referred to as the Webstore database). According to a specific embodiment, the database access layer performs pooling and caching of connection objects, where appropriate.

It is also important for a common database schema to be adopted by each of the Front Office systems. According to a specific embodiment, the database 131 is implemented as a shared database which may be accessed by each of the Front Office systems.

Webstore Subsystem (WS)

The Webstore Subsystem (WS) 132 provides an interface for enabling customers to access the on-line store (e.g. Webstore). In a specific embodiment where the Webstore is implemented as a website on the World Wide Web, customers may access the Webstore via the Internet or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the secure Webstore interface is implemented using a secure http protocol (HTTPS), commonly known to those of ordinary skill in the art.

In accordance with a specific embodiment, the Webstore Subsystem 132 supports a number of customer related features such as, for example, self registration; accessing of customer account information; browsing of product categories and category hierarchy; viewing of product images and product information; keyword searches; delivery scheduling; accessing of customer order history; customizable shopping lists; on-line shopping and ordering; etc.

The Webstore Subsystem (referred to as the Webstore) may be implemented using at least one server which is connected to the data network. According to a specific embodiment, the Webstore is implemented using a plurality of web servers (e.g. web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing the Front Office database via the data network.

Additionally, as shown in FIG. 1, the Front Office system may include a number of integrated components which provide additional functionality. For example, the WS may include a plurality of components which provide additional functionality such as, for example, computation of taxes, search capability, credit card billing, etc. Thus, as shown in FIG. 1, for example, the WS 132 includes a tax computation component 114 for computing taxes for each order line item that is sold, and a credit (or debit) card server (CC) component 116 for handling credit and/or debit card authorizations and funds captures. According to at least one embodiment, one or more of these components may be implemented as an asynchronous process in order to reduce or minimize impact on the Webstore server's response time and availability.

Transportation Subsystem (XPS)

The Transportation Subsystem (XPS) 124 generally handles delivery window scheduling, delivery vehicle routing, capacity planning, and mobile field device programming used by delivery couriers. Accordingly, the Transportation Subsystem may be configured to provide the following functional features: (1) delivery scheduling, and delivery window reservation; (2) deliveries to customer site with appropriate billing actions and processing, including processing of adjustments, credits, and returns; and (3) adjusting delivery operation parameters such as, for example, truck route plans, delivery vehicle usage, service duration, parking time, delivery courier scheduling, data to be downloaded into MFDs, etc.

As shown in FIG. 1, for example, the Transportation Subsystem 124 may comprise a plurality of components and/or other subsystems including MFD Server(s) 112, mobile field client devices (MFD Clients) 106, and delivery couriers 110. In alternate embodiments, at least a portion of these components such as, for example, the MFD Server 112, may be implemented as a separate subsystem and may reside external to the Transportation Subsystem.

One function of the Transportation Subsystem is to generate a list of available delivery windows (for presentation to the customer) based upon transportation capacity data such as, for example, the number of couriers available, the number of delivery vehicles available, the number of orders for a particular day, truck routes, etc.

Dispatch Subsystem (DS)

According to at least one embodiment, the Transportation Subsystem may include a Dispatch Subsystem 107 for allowing real-time access to the state and/or status of delivery couriers and delivery vehicle resources. Using the Dispatch Subsystem, dispatchers may communicate with delivery couriers that are en-route, and may also use the Dispatch Subsystem to provide real-time re-scheduling of delivery routes. According to a specific embodiment, the Dispatch Subsystem may be implemented via the MFD Subsystem (described in greater detail below).

Customer Relationship Management (CRM) Subsystem

The Customer Relationship Management Subsystem 126 is an interactive application which may be used by customer service representatives (CSRs) 143 to manage customer service requests and to track customer interaction. The functionality provided by the CRM subsystem may include, for example, accessing customer information; issuing credits for various customer issues (e.g. complaints, returns, damaged goods, etc.); handling work flow for processing customer issues; etc. The CRM subsystem provides CSRs (sometimes referred to as customer service operators—CSOs) with the ability to access, view, and edit customer information in accordance with customer requests.

The general architecture of the CRM Subsystem is similar to that of the Webstore Subsystem. For example, in a specific embodiment, the CRM subsystem may use the same application, business object, and database access layers which is used by the Webstore Subsystem.

In the embodiment shown in FIG. 1, the CRM subsystem comprises a Help Desk component 144. In a specific implementation, the Help Desk component is implemented using the Remedy software package, manufactured by Remedy Corp., of Mountain View, Calif. The Help Desk component manages any workflow for handling specific customer requests or issues. For example, the Webstore and Transportation Subsystems may generate trouble tickets for various events such as, for example, failed credit card authorizations or customer-reported shorts in delivery. The CSRs process these trouble tickets via the Help Desk component 144 of the CRM subsystem. Utilizing the Help Desk component, the CSRs are able to initiate and track any customer contact relating to the processed trouble tickets. The CSRs may access the Help Desk component 144 via a Help Desk GUI 142.

According to a specific embodiment, the Help Desk component includes a database 145 for managing customer service requests and/or issues. Alternatively, the Help Desk component may be configured to share the Front Office database 131.

Order Management Subsystem (OMS)

The Order Management Subsystem (OMS) 150 manages a variety of aspects related to the integrated system architecture of the present invention, including, for example, pricing, availability, inventory, vendors, financials, procurement, and data flows between various subsystems. As shown in FIG. 1, the OMS subsystem 150 includes graphical user interface 152, and at least one database 151 for storing various data received from at least a portion of the other subsystems.

The Order Management Subsystem is also configured to include appropriate software and/or hardware for managing financial and distribution applications. According to a specific embodiment, the financial and distribution software is provided by PeopleSoft Corporation of Pleasanton, Calif. Additionally, the financial and distribution application software may include a plurality of components such as, for example, a user interface used for inquiry and on-line transaction entry, batch processes used for background processing of data, reports, etc.

The OMS batch processing may be controlled using a process scheduler. The process scheduler is able to manage the number of concurrent processes being run and the date/time at which certain processes are to run or be executed. The process scheduler may also enable central visibility of all processes currently running. Batch processing and reporting may be accomplished using a variety of different technologies commonly known to one having ordinary skill in the art.

The Order Management Subsystem may be configured to support both asynchronous and synchronous interfaces with the other subsystems. In a specific embodiment, the OMS is configured to support an asynchronous interface with each of the other subsystems. Additionally, each OMS interface is configurable, and may be configured to support the running of batch processes as often as is desirable.

Order Fulfillment Subsystem (OFS)

The Order Fulfillment Subsystem 160 manages all functionality of the area distribution center (DC) 170. In the embodiment of FIG. 1, the OFS includes appropriate hardware and/or software for managing the DC facility 170, including, for example, a warehouse management system (e.g. software application), and at least one database 161. The warehouse management subsystem may also provide the interface for allowing the OMS subsystem to communicate with the OFS database 161.

Mobile Field Device (MFD) Subsystem

Although the MFD Server 112 may conceptually be grouped with the Transportation Subsystem, in a specific embodiment, the MFD Server component 112 may configured to include at least one back-end server which resides in a particular area data center. Thus, different areas may be serviced by different MFD Servers. Moreover, each zone in a particular area may serviced from a station which may be connected to the area data center via the data network. Each MFD Client 106 may communicate with an area MFD Server 112 via the data network, and download and/or upload various types of information, including, for example, customer order history information, delivery information (e.g. vehicle delivery routes, stops, etc.), customer returns information, credits, adjustments, etc.

According to a specific implementation, each delivery courier carries an MFD Client while making his or her delivery run to the customer sites. During delivery, the MFD Client 106 may be configured to provide the delivery courier with delivery route information, including delivery routes and stops. Additionally, the MFD Client may also be configured to verify delivered items upon delivery. Further, using the MFD, the delivery courier is able to immediately process a variety of customer service requests at the customer site (e.g. at the time of delivery to the customer), such as, for example, order modifications, customer returns, billing adjustments, inventory adjustments, credits, etc. According to a specific embodiment, the MFD Client is able to process these various customer service requests using data stored within the device, which has been downloaded into the MFD unit prior to the delivery. Thus, according to this embodiment, the MFD Client does not communicate with the MFD Server while processing the customer service requests at the delivery site. Alternatively, however, the MFD Client may be configured to communicate with the area MFD Server during processing of the customer service request using any one of a number of standard mobile communication techniques such as, for example, RF data systems, cellular data systems, etc. In this latter embodiment, the MFD Client may also be configured to allow processing of customer service requests, even at times when the MFD Client is temporarily unable to communicate with the MFD Server. To accomplish this, the customer MFD data is previously downloaded into the MFD Client at a time when the MFD Client is able to communicate with the MFD Server.

After the MFD has processed all appropriate transactions at the customer delivery site (including verification of current ordered items received by the customer), the MFD may also be configured or designed to provide the customer with an adjusted billing receipt (i.e. zero balance receipt), showing a total amount to be billed which takes into account any billing adjustments related to any processed returns, credits, adjustments, etc.

After completing deliveries on the delivery route, the courier, upon returning to the station, may connect the MFD Client 106 to the MFD Server 112, and upload all of the processed field transactions into the area data center, where it is then processed and stored in the Front Office database 131. The uploaded MFD data may also include the times at which the delivery events occurred.

According to a specific embodiment, the customer is not billed for the delivered order until after the order has been delivered and the MFD data relating to the delivery has been received at the Front Office system. The customer will then be billed for the adjusted total amount to be billed, indicated on the adjusted billing receipt (which was presented to the customer at the time of delivery). In this way, the customer will know, at the time of delivery, all charges for which the customer will be billed.

Figure 1A:
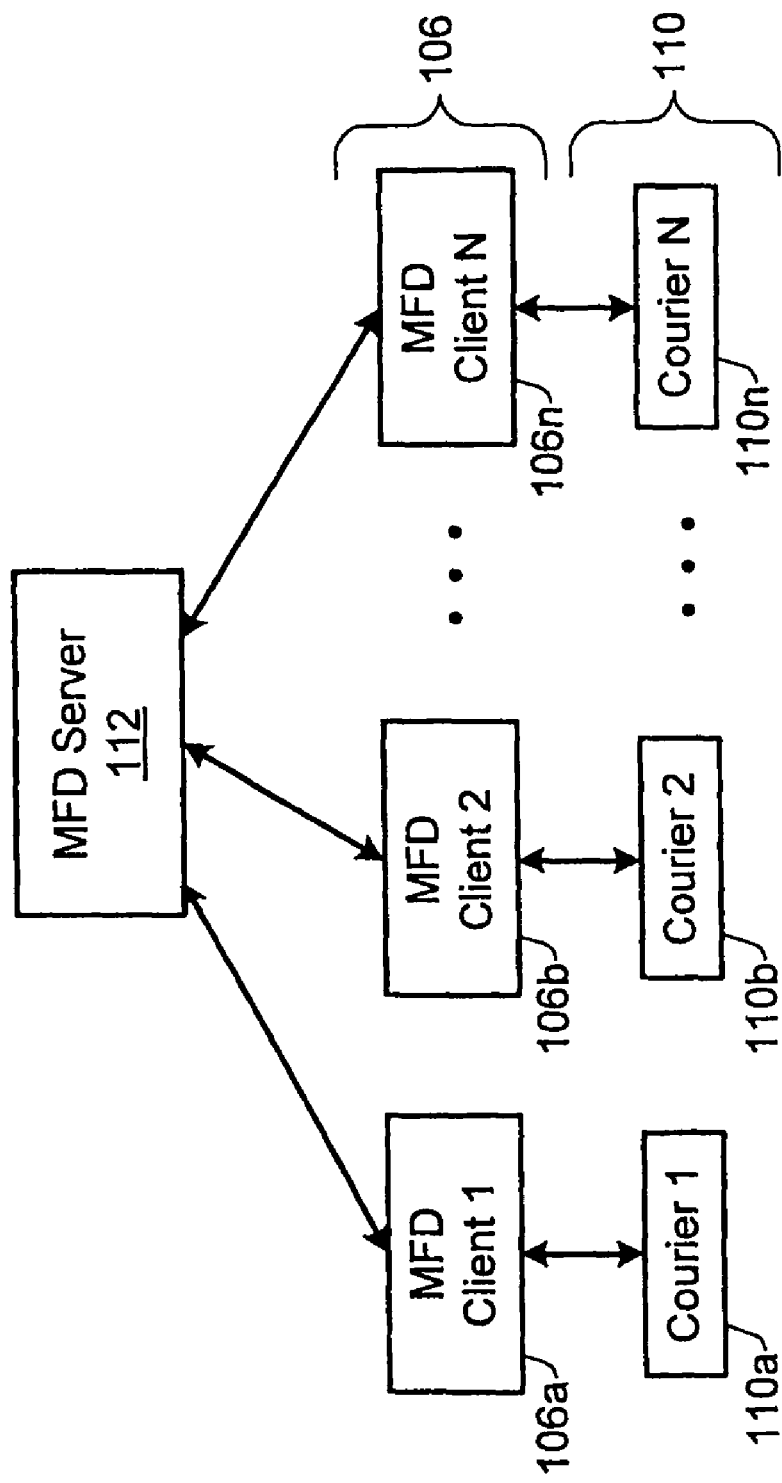
FIG. 1A shows a schematic block diagram of a system which may be used for processing customer service transactions at the customer site in accordance with a specific embodiment of the present invention.

FIG. 1A shows a block diagram of a portion of the system 100 of FIG. 1, which includes an MFD Server 112, a plurality of MFD Clients 106, and a plurality of delivery couriers 110. As described previously, the MFD Server 112 may be configured to include at least one back-end server which resides in a particular area data center. Thus, or example, according to one embodiment, the MFD Server 112 physically resides at the Front Office Subsystem 130 (FIG. 1).

According to a specific embodiment, a logical MFD Server may be implemented to handle the back-end transactions processed by the mobile field devices (MFDs) assigned to a specific distribution area. Thus, for example, in the embodiment of FIG. 1A, MFD Server 112 may handle all MFD transactions associated with a specific area distribution center (e.g., area DC 170, FIG. 1). In one embodiment, each area distribution center may service one or more local cross-dock stations in that area. Each cross-dock station (herein referred to as "station") provides local service to customers residing in designated delivery zones. Customer orders which are fulfilled by the distribution center (170, FIG. 1) may be off-loaded to an appropriate station where the order may then be delivered to the customer using a local delivery vehicle and courier 110. For example, referring to FIG. 1A, couriers 1 and 2 (110*a*, 110*b*) may be associated with a first station, and courier N (110*n*) may be associated with a second station. Each of the plurality of couriers 110 is assigned a respective delivery route. Additionally, each of the plurality of couriers is assigned a respective mobile field device (MFD) (also referred to as an MFD Client) for processing customer service transactions that take place on that courier's delivery route. Thus, in this example, MFD Server 112 will be configured to handle the back-end transactions for all MFD Clients 106 within a designated distribution area. According to a specific implementation, the MFD Server 112 may be deployed using a plurality of servers that have been configured to operate on a networking platform such as, for example, Windows NT, Unix, etc. Together, the plurality of servers may form the logical MFD Server 112 of FIG. 1A.

The plurality of MFD Clients (106*a*, 106*b*, 106*n*) of FIG. 1A correspond to mobile computing devices which are used by the plurality of couriers 110 to process transactions at the customers' delivery site. Each MFD Client may be configured to run on a variety of different operating systems such as, for example, DOS, PALM O/S, etc. According to one implementation, an MFD Client may be implemented using a mobile computing device such as the PC-based Telxon 1124 device manufactured by Telxon Corporation of Akron, Ohio.

According to an alternate embodiment, the MFD Client may be implemented using a PDA-type device such as the Symbol SPT 1700, manufactured by Symbol Technologies of Holtsville, N.Y.

Generally, the MFD Client and Server devices of the present invention may be implemented via software and/or hardware. A software or software/hardware hybrid MFD Server system of this invention is preferably implemented on a general-purpose programmable machine selectively activated or reconfigured by a computer program stored in memory. Further, the MFD Server may have multiple network interfaces for communicating with MFD Clients via a local or wide area network. In an alternative embodiment, the MFD Server system may be implemented on a general-purpose network host machine such as a personal computer or workstation. According to a specific implementation, the MFD Server may be configured to simultaneously communicate with multiple MFD Clients. Further, the invention may be at least partially implemented on a card (e.g., an interface card) for a network device or a general-purpose computing device.

Figure 6:
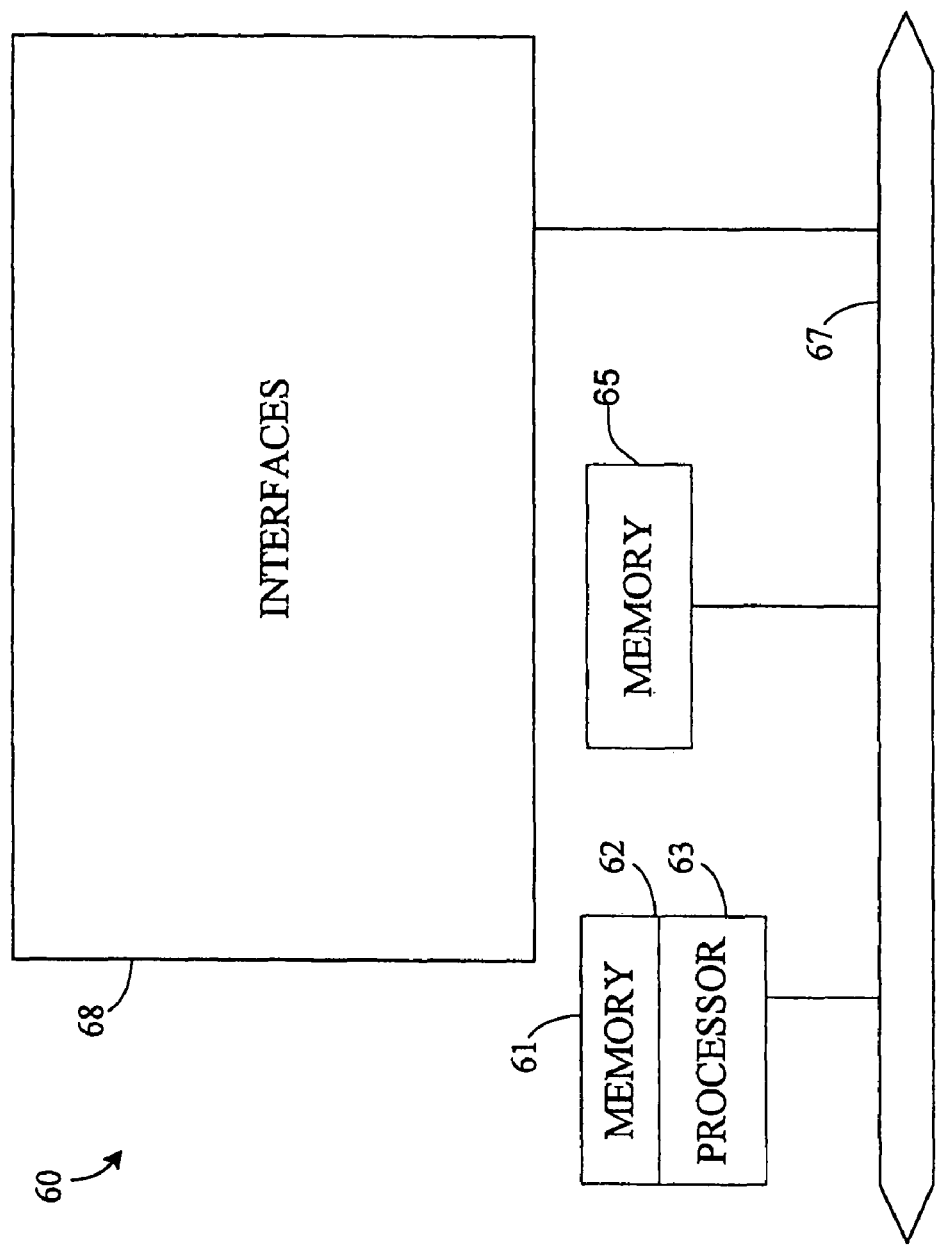
FIG. 6 shows a block diagram of a mobile computing device (MFD) in accordance with a specific embodiment of present invention.

Similarly, each MFD Client may be implemented using a software/hardware hybrid mobile computing device such as, for example, the handheld computing devices described previously. Referring to FIG. 6, a specific implementation of a mobile computing device 60 is shown which is suitable for implementing the MFD Client device of present invention. As shown in the implementation of FIG. 6, the MFD Client device 60 includes a master central processing unit (CPU) 62, one or more interfaces 68, and a bus 67 (e.g., a PCI bus). When acting under the control of appropriate software or firmware, the CPU 62 is responsible for such tasks as generating and recording time stamps, storing and displaying of delivery route information, storing and displaying customer order history, processing customer service field transactions, etc. The CPU preferably accomplishes all these functions under the control of software including an operating system and any appropriate applications software. CPU 62 may include one or more processors 63 such as a processor from the Motorola family of microprocessors or the Intel family of microprocessors. In an alternative embodiment, processor 63 is specially designed hardware for controlling the operations of the MFD Client device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

Each MFD may also include a scanner (not shown) which may be used, for example, to scan bar codes or UPC codes. Further, as shown in FIG. 6, each MFD Client may include at least one interface 68 for communicating with the MFD Server 112. According to one implementation, the MFD Client may be configured to communicate with the MFD Server using a docking cradle which is connected to the MFD Server via a local or wide area network. Each station may be provided with a plurality of docking cradles for simultaneously connecting multiple MFDs to the MFD Server 112. Alternatively, according to a different implementation, the MFD Client 106a may be configured to include a wireless LAN transceiver for communicating with the MFD Server. In a specific embodiment, each station may be provided with one or more transponders for communicating with MFDs using a wireless protocol. Each transponder may be configured to communicate with the MFD Server via a local or wide area network.

According to a specific embodiment, the MFD Client 60 may be implemented on a PDA device such as, for example, a device similar to the well-known Palm series of PDA devices manufactured by Palm, Inc., of San Jose, Calif. In this embodiment, the MFD Client may be configured to run on a Palm OS platform licensed by Palm, Inc. According to a specific implementation, a synchronization mechanism may be used to transfer data between the MFD Server and the MFD Client in a manner similar to the way data is transferred between a Palm device and a desk top computer using Palm's HotSync manager software. For example, a client synchronization program running on the MFD Client may serve as the MFD Client agent, and a server software program running on the MFD Server may serve as the server agent. According to a specific implementation, the server and client synchronization software may be implemented using software provided by Aether Software, of Vienna, Va. Further, according to a specific implementation, synchronization may be achieved using a TCP/IP based protocol.

The MFD Client may be configured or designed to perform a variety of different functions and may also be configured or designed to retrieve, generate, and/or store a variety of different data relating to one or more customer orders. For example, the MFD Client may be configured to process, at a customer delivery site, transactions relating to a current and/or previous customer orders, and may further be configured to process such transactions in the absence of a communication link between the MFD Client and the MFD Server. Thus, for example, according to a specific implementation, each MFD Client may be configured or designed to process in-field transactions relating to customer returns, customer order shorts, credits (e.g., credit for late delivery), fees (e.g., re-delivery fee), tote deposits/returns, tote verification, customer ID verification, ID checks (e.g., for tobacco/alcohol), coupons and/or promotional offers, signature capture, printing of zero-balance receipts, printing of Return Merchandise Authorization (RMA) slips, etc.

Additionally, each MFD Client may be configured or designed to store various types of data which may include, for example, customer delivery addresses, customer notes and/or instructions, delivery time information, deliver route and/or map information, customer order history, etc. The MFD data downloaded to the MFD Client may also include pre-defined reason codes which may be accessed by the delivery courier to provide an explanation for an adjustment transaction that is processed at the customer delivery site.

Customer notes or instructions stored on an MFD Client may include notes from delivery couriers, notes from customer service representatives, and may also include notes from the customer (e.g. special delivery instructions) which may be entered by the customer via the Internet. According to a specific embodiment, the MFD Client may be configured to retrieve and store customer order history data for selected customers on the delivery route. The customer order history may include current order information, as well as past order history information (e.g., within the last 30 days). The customer order information may include, for example, a price paid for each item as ordered, a quantity of each item ordered, a date that the item was ordered and/or delivered, a SKU number associated with each ordered item, a bar code ID associated with each ordered item, and a tax amount (if any) which was paid for each ordered item. According to a specific embodiment, the MFD Client includes a display which may be used for displaying data stored in the memory of the MFD Client. In one implementation, the customer order history information stored in the MFD Client may be sorted using a variety of different criteria such as, for example, by customer order, by date, by SKU, etc.

Further, for processing customer returns, the MFD Client may be configured to differentiate between returned goods which are to be returned to the distribution center (DC) for restocking (for which an RMA slip or "chit" will be printed), and returned goods which are to be scrapped or thrown away (for which no RMA slip will be printed).

The MFD Client and Server devices of the present invention may also employ one or more memories or memory modules (such as, for example, memory block 65) configured to store data, program instructions for the MFD data transactions described herein, etc. The program instructions may control the operation of an operating system and/or one or more applications, for example. The memory or memories may also be configured to store the various types of MFD data described in this application, such as for example, customer delivery addresses, customer notes and/or instructions, delivery time information, deliver route and/or map information, customer order history data, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 2:
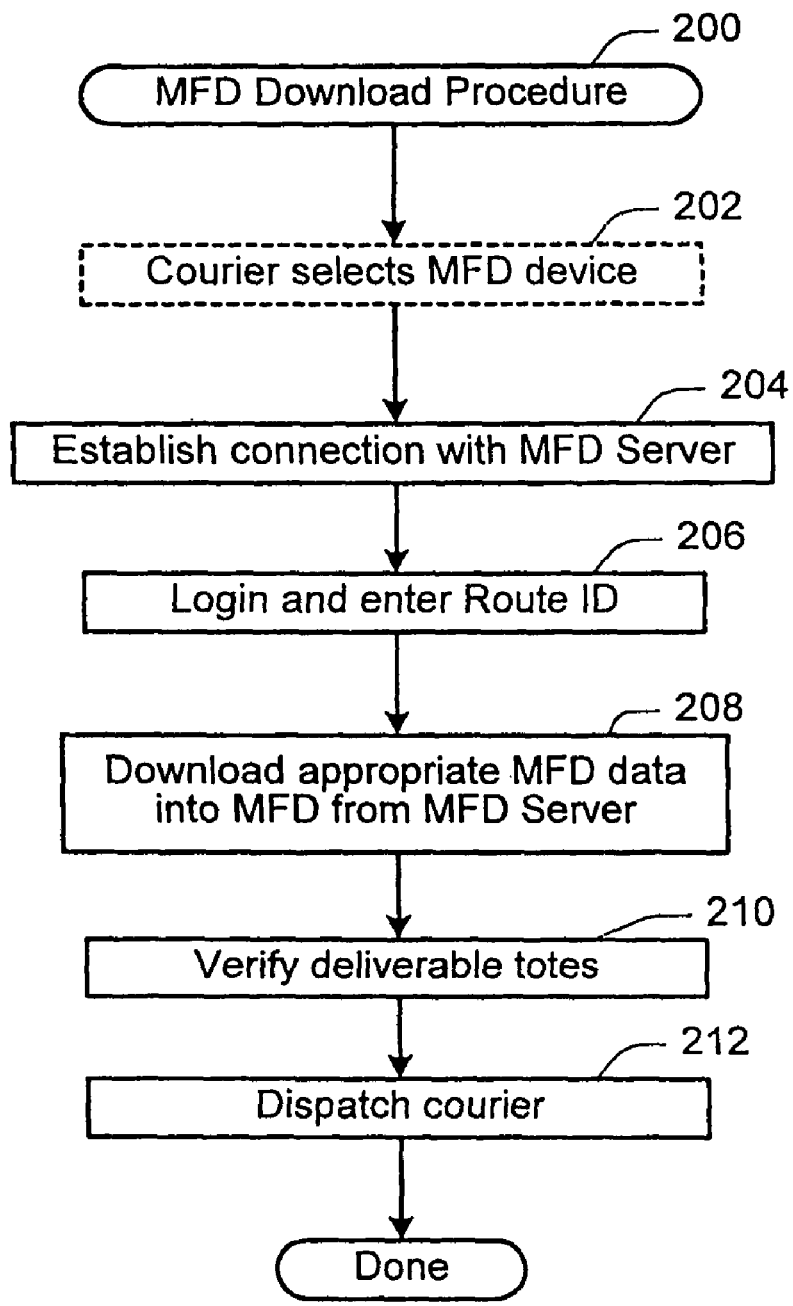
FIG. 2 shows a flow diagram of an MFD Download Procedure 200 in accordance with a specific embodiment of the present invention.

FIG. 2 shows a flow diagram of a MFD Download Procedure 200 in accordance with a specific embodiment of the present invention. The MFD Download Procedure 200 may be initiated, for example, by a delivery courier before departing the station to deliver orders to customers on the courier's delivery route. In the example of FIG. 2, it is assumed that each delivery courier at a particular station has been assigned a respective delivery route. At 202, the delivery courier selects a MFD Client device (herein referred to as "MFD Client") to receive downloaded MFD data from the MFD Server. According to one embodiment, each delivery courier may be assigned a specific MFD Client for a specified time period.

After the delivery courier has selected or been assigned a specific MFD Client at the cross-dock station, the delivery courier activates the MFD Client in order to establish (204) a connection with the MFD Server. In one embodiment, the delivery courier places the MFD Client into a cradle which provides a connection to the MFD Server. According to an alternate embodiment, the delivery courier simply depresses a key or switch on the MFD Client to cause the device to establish a wireless connection with the MFD Server 112. At 206, the delivery courier enters (206) login information and a route ID corresponding to that delivery courier's assigned delivery route. Once the login and route ID data has been verified by the MFD Server, the MFD Server retrieves MFD data relating to the identified route ID, and downloads (208) the appropriate MFD data into the memory of the MFD Client. The various data flows which may occur between the MFD Client and MFD Server during the MFD Download Procedure 200 are described in greater detail with respect to FIG. 5 of the drawings.

After the appropriate MFD data has been downloaded into the courier's MFD Client, the courier then verifies (210) the deliverable totes for that courier's delivery route. According to a specific embodiment, the delivery tote verification may be accomplished using the MFD Client to scan the bar-coded license plates of all delivery totes at the station which have been assigned to the delivery courier. The MFD Client may be used to verify that all delivery totes are accounted for before the courier is dispatched from the station. If all deliverable totes are not accounted for, the MFD Client may display to the delivery courier the IDs of the missing totes. In the event that the missing totes are not to be found at the cross-dock station, the items from the missing totes will be processed as shorts for the associated customer order(s). After verifying the deliverable totes associated with his or her delivery route, the delivery courier may then be dispatched (212) from the station to deliver the totes to the awaiting customers.

According to a specific embodiment, each delivery route includes a plurality of stops which correspond to specific customer delivery addresses. Further, each stop in the delivery route may correspond to a specific customer order.

Figure 3:
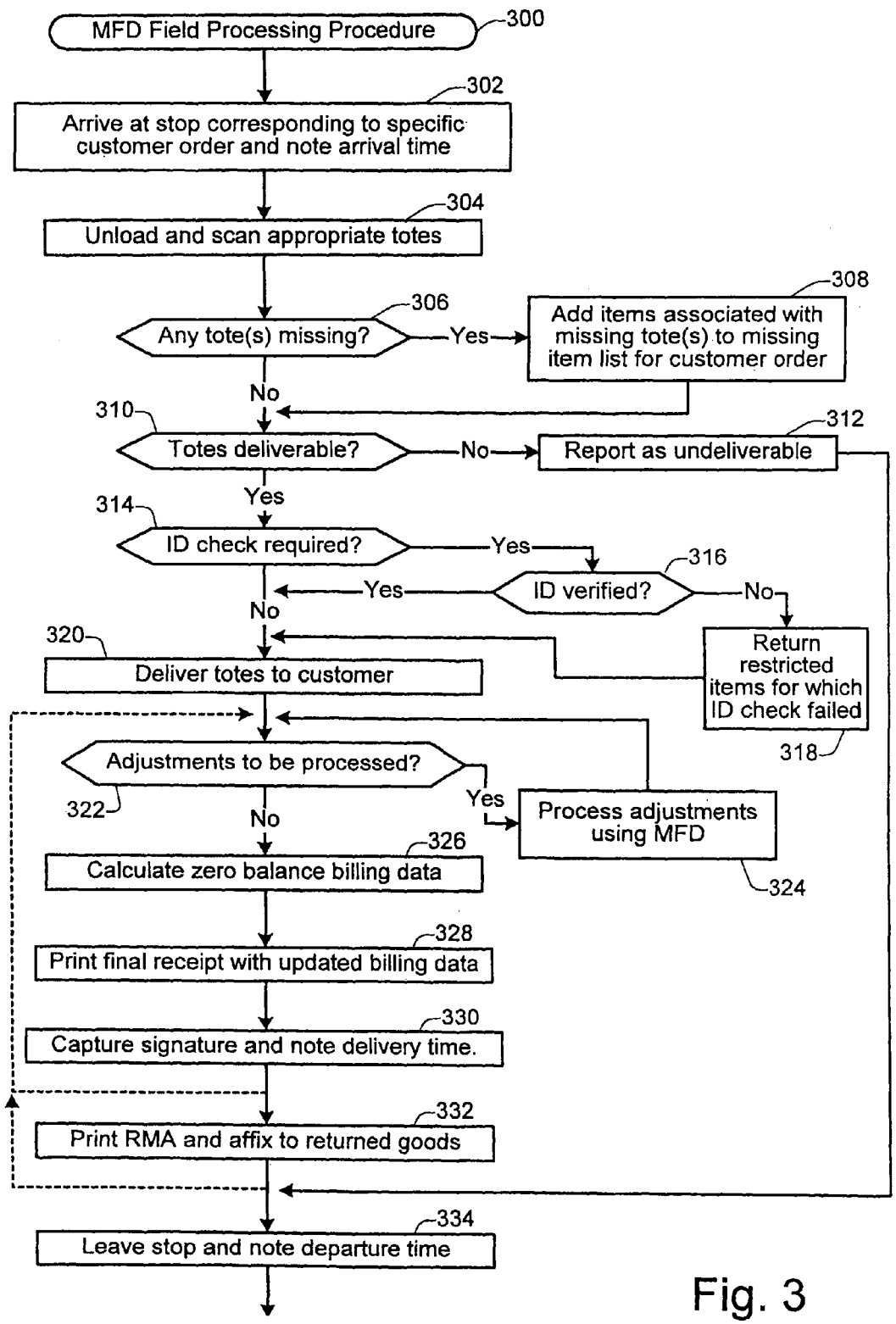
FIG. 3 shows a flow diagram of an MFD Field Processing Procedure 300 in accordance with a specific embodiment of the present invention.

FIG. 3 shows a flow diagram of an MFD Field Processing Procedure 300, in accordance with a specific embodiment of the present invention. The MFD Field Processing Procedure 300 may be initiated at each stop on a courier's delivery route. At 302, the delivery courier arrives at a delivery stop corresponding to a specific customer order, and notes the arrival time. According to a specific embodiment, when the delivery courier arrives at a specific delivery stop, the courier depresses a key on the MFD Client, which causes the MFD Client to record the arrival time of the courier at the specified stop. The delivery courier may then unload and scan (304) the appropriate totes for customer order associated with that delivery site. Each tote may be scanned using the MFD Client. Once the appropriate totes have been scanned, the MFD Client may determine (306) whether any totes are missing from the customer order. If it is determined that one or more totes are missing from the customer order, the MFD Client adds (308) the items associated with the missing totes to a missing item list associated with that customer order.

At 310, a determination is made as to whether the totes are deliverable to the customer. According to a specific implementation, the customer may authorize an "unattended delivery," wherein the delivery courier may deliver the ordered item without obtaining the customer's signature. However, in the event that the customer signature is required for delivery of the order, and no one is available to sign for the delivery, the order will be reported (312) as undeliverable. When the delivery courier determines that an order is undeliverable, the courier may enter this information into the MFD Client, along with selected reason code(s). According to a specific embodiment, the MFD Client may then automatically assess a re-delivery fee for the customer order. It will be appreciated that the procedural elements of blocks 310 and 312 may occur before the delivery courier unloads the appropriate totes from the delivery truck.

Assuming that the customer order totes are deliverable, at 314, the MFD Client determines whether an ID check is required for at least a portion of the ordered items. As stated previously, an ID check may be required for ordered items such as tobacco or alcohol. If an ID check is required, the MFD Client may instruct a courier to verify information on the customer's ID. For example, an order includes a carton of cigarettes and a bottle of alcohol, where the minimum smoking age is 18, and the minimum drinking age is 21, the MFD Client may instruct the delivery courier to verify that the customer is at least 18 to receive the carton of cigarettes, and may further instruct the courier to verify that the customer is at least 21 to receive the ordered bottle of alcohol. At 316, the delivery courier performs the ID verification. If, for any reason, the delivery courier determines that the ID verification has failed (e.g., improper ID, under age, etc.) then, at 318, the restricted items for which the ID check failed are retained by the delivery courier. Additionally, at 318, the MFD Client may process the undelivered, restricted items as a customer return.

At 320, the courier delivers the totes to the customer. According to a specific embodiment, as each tote is scanned by the courier using the MFD Client. The MFD Client then adds a separate tote deposit fee to the customer order. After the totes have been delivered to the customer, the courier is able to process (322, 324) any adjustments or customer service transactions using the MFD Client. According to at least one embodiment, the MFD Client may be used to process customer service transactions (e.g. adjustments) at any time while the delivery courier is at the customer delivery site. As stated previously, the adjustments which may be processed (324) using the MFD Client may include item returns, shorts, credits, fees, tote deposits/returns, coupons, etc.

For example, a customer may wish to return a container of milk which was purchased in an order that was delivered 2 weeks previously. According to a first implementation, the delivery courier may use the MFD Client to process (324) the returned item by scanning the item's bar code or UPC code. During this processing, the MFD Client may compare the scanned UPC code against a list of UPC codes included in that customer's downloaded order history (which, for example, may include all ordered items within the past 30 days). When a UPC code match is found in the customer order history, the price which the customer paid for the item in the original order is immediately credited back to the customer. Additionally, any tax which the customer paid on the item is also credited back to the customer. If more than one UPC code match is found (meaning that more than one container of milk was purchased by the customer within the last 30 days), the customer order history information relating to the matched UPC codes can be displayed to the courier, and the courier may then select the appropriate matched item to ensure proper processing of the customer return. Alternatively, according to a different embodiment, the delivery courier may scroll through a list of previous ordered items using the MFD Client. The items may be sorted, for example, by order number. When the delivery courier encounters the entry for the previously ordered item which is being returned, the courier may then select that item to thereby cause the MFD Client to process (324) the selected item as a customer return. The courier may also enter one or more pre-defined reason codes to help explain why the customer is returning the item. In this example, the container of milk may be classified as a "scrapped" good, meaning that it will be disposed of rather than being returned to the distribution center for re-sale. Accordingly, the MFD Client need not generate an RMA slip for the returned container of milk.

Using a different example, it will now be assumed that the customer desires to return 2 unopened boxes of breakfast cereal which were originally purchased as part of a 4-pack. Like the example above, the delivery courier may use the MFD Client to process (324) the return transaction(s) for the 2 unopened boxes of cereal. However, in this example, the customer will be credited for a pro-rated amount of the original purchase. Thus, for example, if the customer order history data in the MFD Client indicates that the customer originally paid $8.00 for the 4-pack of cereal, the customer would be credited one-half of that amount, or $4.00 for the returned items. Additionally, the customer will be credited a pro-rated amount of tax which the customer paid in the original order. Thus, for example, if the customer originally paid $1.00 in tax for the purchase of the 4-pack of cereal, the customer will be credited $0.50, which represents the tax value of the returned merchandise. Furthermore, since the returned boxes of cereal may be returned to the distribution center for re-sale, the MFD Client will generate a RMA slip for the returned boxes of cereal. According to a specific implementation, the MFD Client will add the 2 boxes of cereal to an RMA list associated with the customer order being delivered.

Each time an adjustment and/or customer service transaction is processed by the MFD Client, the MFD Client calculates (326) updated billing data for the customer order which is being delivered. The updated billing data may be referred to as zero balance billing data, which corresponds to updated customer billing data that reflects the current balance in the customer's account, after taking into account all processed transactions at the customer site using the MFD Client. Thus, for example, the zero balance billing data may include billing data relating to the customer order as well as all transactions processed by the MFD Client for that customer. Moreover, according to at least one embodiment, the net payment amount reflected in the zero balance billing data will be the exact amount which the customer will be charged or credited. In this way, the customer will know, at the time of delivery, all charges and credits for which the customer will be billed and/or credited. This feature is advantageous in that it provides the customer peace-of-mind in knowing that no additional charges will appear on the customer's bill or credit card after the delivery courier returns to the station.

Once the MFD Client has processed all desired customer transactions and calculated the updated zero balance billing data, a final receipt is printed (328) which includes the updated zero balance billing data. According to a specific implementation, the final receipt will show all credits, returns, fees, and other adjustments processed at the customer site, and will additionally show a revised total amount to be billed to the customer. The courier then captures (330) the customer signature on the MFD Client. At the same time, the MFD Client may record the time at which the customer signature is captured. At 332, the delivery courier uses the MFD Client to print a RMA slip for any returned items which are to be returned to the distribution center for re-stocking, and affixes the RMA slip to the tote which contains the returned goods. At this point, the delivery of the customer order has been completed, and the delivery courier may depart to the next delivery stop.

However, at any time before the delivery courier leaves the current delivery stop, the customer may request additional adjustments to be processed such as, for example, additional returns, credits, shorts, etc. In response, the delivery courier may use the MFD Client to process the additional transactions in the same manner described above. Thereafter, a new final receipt with updated zero balance billing data will be printed and delivered to the customer, and a new signature of the customer will be captured. Additionally, a new RMA slip may be printed which will include any additional items to be returned to the distribution center.

At 334, the delivery courier leaves the current delivery stop and notes the departure time. According to a specific embodiment, the delivery courier may depress one or more keys or buttons on the MFD Client to retrieve the next delivery stop information. At that time, the MFD Client may note the current time and record the current time value as the departure time from the current delivery stop. When the courier arrives at the next delivery stop, the MFD Field Processing Procedure 300 may be repeated as described above.

After the delivery courier has completed delivery to all stops on his or her delivery route, the delivery courier returns to the cross-dock station. Once the delivery courier has arrived at the station, the courier may then upload the data from the MFD Client to the MFD Server 112, as shown, for example, in FIG. 4 of the drawings.

Figure 4:
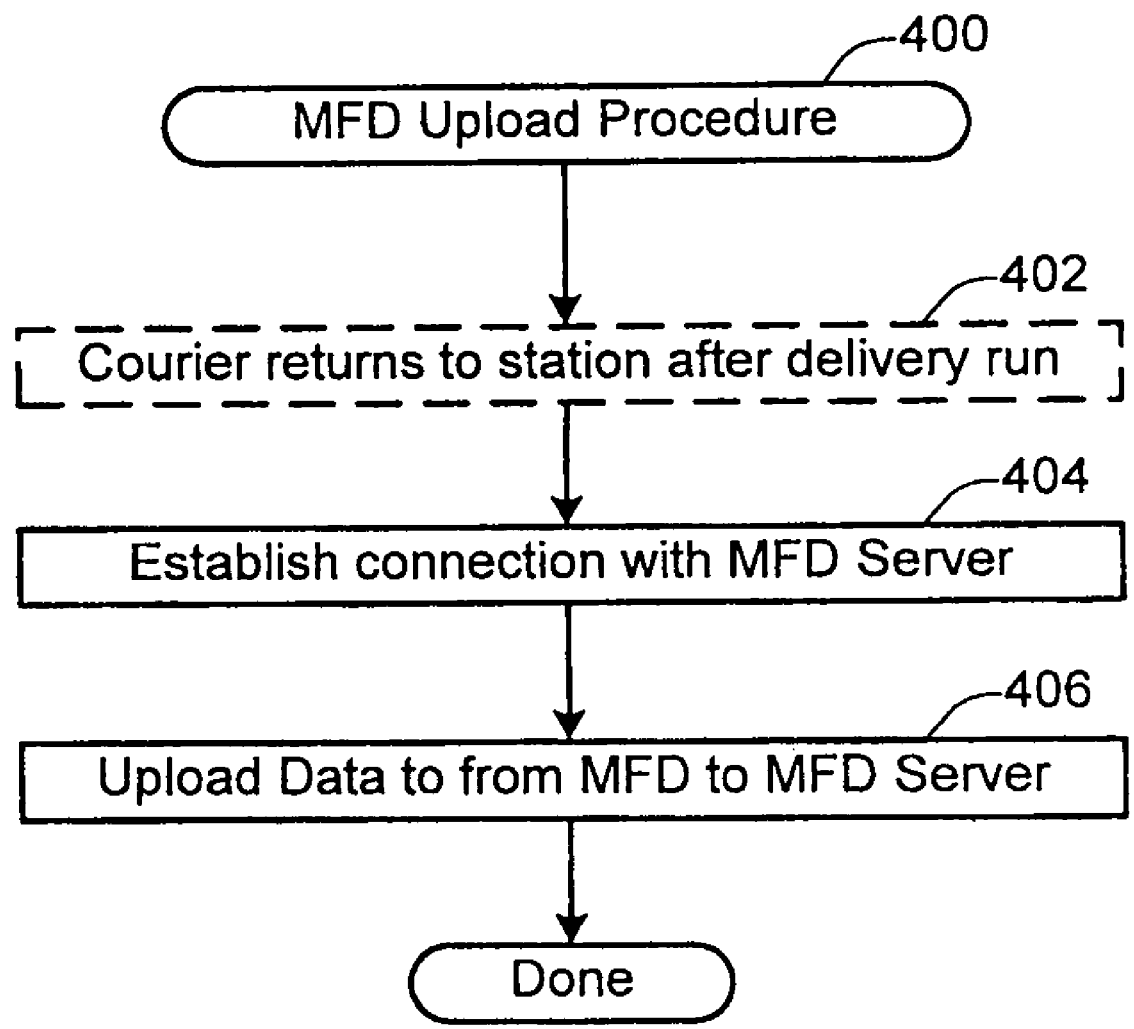
FIG. 4 shows a flow diagram of an MFD Upload Procedure 400 in accordance with a specific embodiment of the present invention.

FIG. 4 shows a flow diagram of a MFD Upload Procedure 400 in accordance with the specific embodiment of the present invention. The Procedure 400 of FIG. 4 may be initiated for each delivery courier returning to a station after completing his or her delivery run (e.g., 402). The delivery courier then activates the MFD Client to establish (404) a connection with the MFD Server 112. As stated previously, the connection with the MFD Server may be accomplished using a wired interface or, alternatively, a wireless interface. Once the connection with the MFD Server is established, data captured and/or generated by the MFD Client during the delivery run is uploaded (406) from the MFD Client to the MFD Server. According to at least one embodiment, the data which is uploaded to the MFD Server may include adjustment data relating to any adjustments or customer service transactions processed by the MFD Client. The uploaded MFD data may also include customer signature data, time stamp data, reason code data, etc. Once the MFD Server has received the uploaded data from the MFD Client, the MFD Server processes the received data, and stores the process data in the Webstore Database 131 as shown, for example, in FIG. 5 of the drawings.

According to a specific implementation, each MFD Client may be configured to communicate via a wireless communication system with the MFD Server while the delivery courier is making his or her delivery run to the customer sites. For example, the MFD Client may include a radio transponder which communicates with a radio transceiver for communicating with the MFD Server. In this embodiment, it is possible for the MFD Client to immediately transmit to the MFD Server any desired data which the MFD Client captures and/ or generates while in the field. For example, the MFD Client may transmit the arrival and departure times of the delivery courier at specific customer stops in real-time. Using this information, a dispatch operator at the cross-dock station is able to automatically track the status of each delivery courier in the field. Further, according to a specific embodiment, when the communication link between the MFD Client and the MFD Server is broken, the MFD Client is able to store all processed data which it collects and/or generates in the field and subsequently transmit, via a batched process, the stored data to the MFD Server when the communication link to the MFD Server is re-established. Further, it will be appreciated that the MFD Client may be configured to fully perform all functions and operations at times when the MFD Client is unable to communicate with the MFD Server.

Figure 5:
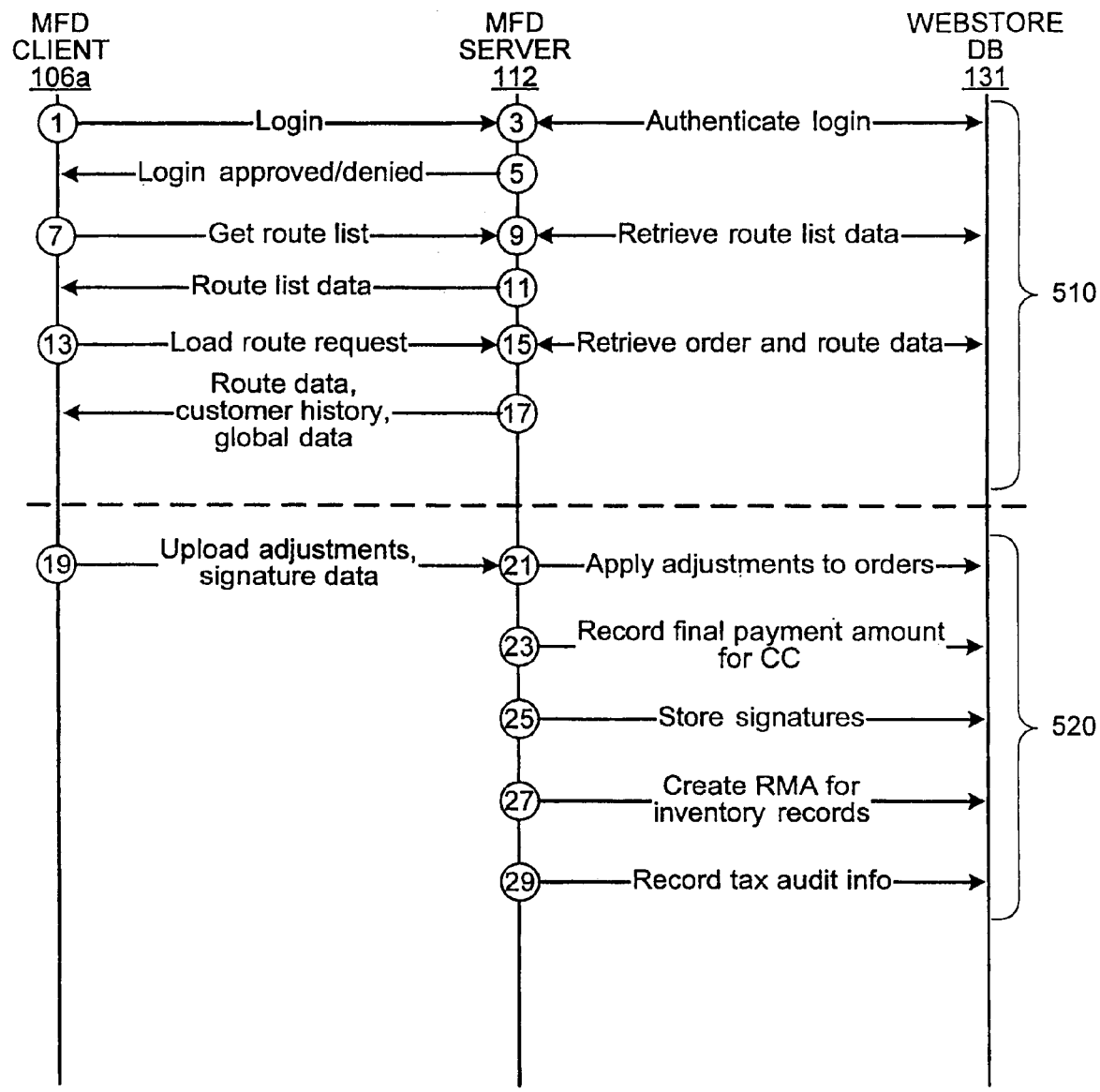
FIG. 5 shows a flow diagram of a specific embodiment of the present invention, illustrating various data flows which may occur between an MFD Client 106a, and MFD Server 112, and a Webstore Data Base 131 of FIG. 1.

FIG. 5 shows a flow diagram of various data flows which occur between an MFD Client 106a, an MFD Server 112, and a Webstore Database 131, in accordance with a specific embodiment of the present invention. A first portion of the data flows (510) may be associated with the MFD Download Procedure 200 of FIG. 2. A second portion of the data flows (520) may be associated with the MFD Upload Procedure 400 of FIG. 4.

Referring to FIG. 5, at (1) the MFD Client 106a transmits login data to the MFD Server 112. Once the MFD Client login data is received at the MFD Server, the MFD Server then retrieves login authentication data from the Webstore Database 131 in order to authenticate the login data received from the MFD Client 106a. The MFD Server then transmits (5) a response to the MFD Client as to whether the login request has been approved or denied. Assuming that the login request from the MFD Client has been approved, the MFD Client may then transmit a route ID (corresponding to the route of the delivery courier using the MFD Client 106a) in order to retrieve MFD data relating to the specific route corresponding to the route ID. If the delivery courier is not able to provide the route ID corresponding to his or her assigned delivery route, the courier may access a route list which includes all route IDs for one or more specific cross-dock stations via the MFD Client. The MFD Client then transmits (7) a request to the MFD Server to retrieve the route list information. When this request is received at the MFD Server, the MFD Server accesses (9) the Webstore Database (131) to retrieve the requested route list data, and then forwards (11) the retrieved data to the MFD Client. Once the delivery courier has entered the desired route ID into the MFD Client, the MFD Client transmits (13) a request to the MFD Server to download MFD data corresponding to the specified route ID. When the MFD Server receives the download request, it retrieves (15) the appropriate customer order history and route data (15) from the Webstore Database (131), and transmits (17) the route data history, customer order history data, and global data to the MFD Client where it is stored. According to a specific embodiment, the global data may include, for example, reason codes with corresponding descriptions, coupon codes, tote deposit values, late delivery credit values, re-delivery fee values, etc.

As shown in the MFD Upload Procedure 400 of FIG. 4, when the delivery courier returns to the station, all data processed by the MFD Client may be uploaded to the MFD Server. This is shown at 19 of FIG. 5, which illustrates an MFD Client 106a uploading data to MFD Server 112. After the uploaded data has been received at the MFD Server, the MFD Server processes the received data, and transmits its processed data to the Webstore Database 131. For example, the MFD Server may apply (21) the uploaded adjustment data to the appropriate customer orders and store this information on the Webstore Database. Additionally, the MFD Server may store or record (23) the zero balance billing data (generated by the MFD Client 106a) on the Webstore Database. The zero balance billing data stored on the Webstore Database may subsequently be used by the credit card capturing server (116, FIG. 1) for charging or crediting appropriate customer credit card accounts. The MFD Server may also store (25) the signature data captured by the MFD Client device 106a. Further, the MFD Server may generate and store (27) RMA data on the Webstore Database. The RMA data generated by the MFD Server may be derived from the RMA data generated by the MFD Client 106a. The RMA data which is stored on the Webstore Database may be subsequently used by the Order Management Subsystem for managing inventory records. Additionally, the MFD Server may store (29) on the Webstore Database any updated tax data uploaded from the MFD Client 106a.

It will be appreciated that the technique of the present invention is not limited to the use of a computerized, mobile, hand-held device such as the MFD Client described in this application. According to at least one alternate embodiment of the present invention, the technique of the present invention may be implemented using a paper method whereby the various functions normally performed by the MFD Client may be performed by the delivery courier using a written format to record the various field transactions which occur during the courier's delivery run. Thereafter, when the delivery courier returns to the cross-dock station, he or she may input the recorded field transactions (e.g., recorded on paper) into a computer system which is connected to a server that is functionally similar to the MFD Server 112.

One advantage of the technique of the present invention is that it provides a means for processing customer service requests and/or adjustments to customer orders at the customer delivery site. Additionally, the technique of the present invention provides a simple and effective solution for allowing customers to return unwanted products, without requiring that the customer package the returned product, obtain a return authorization number, pay for shipping charges, or other burdensome tasks associated with conventional electronic commerce techniques. Further, unlike conventional techniques, the customer may be provided with an updated and finalized bill at the time of delivery which includes all order modifications, returns, and other adjustment transactions. In this way, the customer will be informed at the time of delivery of all charges and/or credits for which the customer will be billed or credited.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for facilitating delivery of at least one customer order via a delivery courier that is assigned a delivery route, the at least one customer order including at least one ordered item, the method comprising:
   providing a mobile computing device to the delivery courier to facilitate delivery of the at least one customer order to at least one customer at a customer delivery stop using customer delivery data;
   downloading data from another computing device to the mobile computing device, the downloaded data including at least the customer delivery data and customer account information, the customer account information including at least customer billing data;
   displaying at least a portion of the customer delivery data on a display associated with the mobile computing device;
   executing an adjustment transaction to the at least one customer order using the mobile computing device while at the customer delivery stop corresponding to the at least one customer, the adjustment transaction resulting from receiving a request by the at least one customer, and the adjustment transaction operating to modify the at least one customer order; and
   displaying updated customer billing data on the display associated with the mobile computing device at the customer delivery stop based on the customer account information and the adjustment transaction.

2. The method of claim 1 wherein the another computing device is a server computing device, and wherein said download of the customer delivery data comprises:
   establishing a connection between the server computing device and the mobile computing device; and
   downloading the customer delivery data from the server computing device to the mobile computing device.

3. The method of claim 1 further comprising:
   dispatching the delivery courier to deliver customer orders for the delivery route,
   wherein the connection between the another computing device and the mobile computing device is implemented using a wireless communication protocol,
   wherein the downloaded data includes customer order history data for customers associated with the delivery route and further includes delivery route information corresponding to the delivery route, and
   wherein the customer order history data includes information relating to all items ordered by the at least one customer within a specified time period.

4. The method of claim 3 further comprising displaying, using the mobile computing device, the delivery route information to the delivery courier to facilitate delivery of orders to customers on the delivery route.

5. The method of claim 1 wherein the adjustment transaction modifies the at least one customer order by removing at least one ordered item of the at least one customer order.

6. The method of claim 1 further comprising recording, at the mobile computing device, an arrival time and/or a departure time from the customer delivery stop.

7. The method of claim 1 further comprising recording, at the mobile computing device, a time related to the delivery courier delivering an order to a customer.

8. The method of claim 1,
   wherein said downloading comprises wirelessly downloading the customer account information to the mobile computing device while at the customer delivery stop, and
   wherein said method further comprises wirelessly transmitting to the another computing device delivery status information corresponding to a status of the delivery courier on the delivery route, wherein the delivery status information is generated by the mobile computing device.

9. The method of claim 8 further comprising tracking the status of delivery resources using the transmitted delivery status information, wherein the delivery resources include at least one of the delivery courier and a delivery vehicle.

10. The method of claim 1 further comprising printing a receipt at the customer delivery stop using the mobile computing device.

11. The method of claim 10 wherein the receipt being printed is an updated receipt for the at least one customer based on the updated customer billing data.

12. The method of claim 1 wherein the customer delivery data being displayed on the display presents an alert to the delivery courier to check an identification.

13. The method of claim 1 wherein the customer delivery data being displayed on the display presents an alert to the delivery courier to capture a customer signature.

14. A method as recited in claim 1,
   wherein the customer delivery data includes an identification check required indication if or more ordered items of the at least one customer order require an identification check, and
   wherein said method further comprises informing the delivery courier via the mobile computing device based on the customer delivery data that an identification check for proof of age is to be performed before delivery of the at least one customer order is completed if the customer delivery data includes the identification check required indication.

15. The method of claim 14 wherein, based on the customer delivery data, the mobile computing device automatically notifies the delivery courier when the at least one customer order being delivered requires the identification check for proof of age in order for the at least one customer to receive one or more items from the at least one customer order.

16. The method of claim 15 wherein the one or more items are restricted items.

17. The method of claim 14 further comprising informing the delivery courier via the mobile computing device that a customer signature is to be captured, the customer signature acknowledging delivery of the at least one customer order.

18. The method of claim 17 wherein the mobile computing device is used to capture the customer signature as well as to record a time when the customer signature was captured.

19. The method of claim 14 further comprising:
processing, at the mobile computing device, a customer return of one or more restricted items of the at least one customer order when the at least one customer is not able to furnish adequate proof of age.

20. A mobile computing device for use by a delivery courier, said mobile computing device comprising:
a processing unit configured to control operation of said mobile computing device;
a display configured to present information to the delivery courier; and
a memory configured to store at least programming instructions executable by said processing unit, said memory storing at least:
programming instructions for accessing customer delivery information, the customer delivery information including at least a delivery route, at least one customer order to be delivered to a customer delivery stop corresponding to a customer, and customer billing data associated with the at least one customer order;
program instructions for presenting at least a portion of the customer delivery information on said display:
programming instructions for executing an adjustment transaction to the at least one customer order while at the customer delivery stop corresponding to the customer, the adjustment transaction resulting from receiving a request by the customer, and the adjustment transaction operating to modify the at least one customer order; and
programming instructions for presenting updated customer billing data at the customer delivery stop via said display based on the adjustment transaction.

21. A mobile computing device as recited in claim 20, wherein said mobile computing device further comprises:
a scanner capable of scanning bar codes or UPC codes.

22. A mobile computing device as recited in claim 20, wherein said memory further stores:
program instructions for informing the delivery courier via the display and based on the customer delivery information that an identification check for proof of age Is to be performed before delivery of the at least one customer order is completed.

23. A mobile computing device as recited in claim 20, wherein said mobile computing device further comprises:
a wireless interface configured to wirelessly transmit to another computing device delivery status information corresponding to a status of the delivery courier on the delivery route, wherein the delivery status information is generated by said mobile computing device, 24. A mobile computing device as recited in claim 23 wherein the another computing device can be configured to track the status of delivery resources using the transmitted delivery status information, and wherein the delivery resources Include at least one of the delivery courier and a delivery vehicle.

25. A computer readable storage medium including at least computer program stored thereon for facilitating delivery of at least one customer order via a delivery courier that is assigned at least one delivery route, the at least one customer order including at least one ordered item, the delivery courier using a mobile computing device to facilitate delivery of the at least one customer order to at least one customer at a customer delivery stop using customer delivery data, said computer readable storage medium comprising:
computer program code for receiving transmitted data from another computing device to the mobile computing device, the transmitted data Including at least the customer delivery data and customer order Information;
computer program code for displaying at least a portion of the customer delivery data on a display associated with the mobile computing device;
computer program code for executing an adjustment transaction to the at least one customer order using the mobile computing device while at the customer delivery stop corresponding to the at least one customer, the adjustment transaction resulting from a request by the at least one customer, and the adjustment transaction operating to modify the at least one customer order; and
computer program code for displaying updated customer billing data on the display associated with the mobile computing device at the customer delivery stop based on the customer order information and the adjustment transaction.

26. The computer readable storage medium of claim 25 wherein the another computing device is a server. computing device, and wherein said computer program code for transmitting data from the another computing device to the mobile computing device comprises:
computer program code for establishing a connection between the server computing device and the mobile computing device; and
computer program code for transmitting the customer delivery data and the customer order information from the server computing device to the mobile computing device.

27. The computer readable storage medium of claim 25 wherein the customer order Information includes customer order history data for at least the at least one customer.

28. The computer readable medium of claim 27 wherein the customer delivery data includes delivery route data corresponding to the delivery route.

29. The computer readable medium of claim 25 wherein said computer readable storage medium further comprises:
computer program code for displaying, using the mobile computing device, the delivery route information to facilitate delivery of orders to customers on the delivery route.

30. The computer readable medium of claim 25 wherein the adjustment transaction modifies the at least one customer order by removing at least one ordered item from the at least one customer order.

31. The computer readable medium of claim 25 further comprising computer program code for recording at least an arrival time at and/or a departure time from the customer delivery stop.

32. The computer readable medium of claim 25 further comprising computer program code for recording a time related to the delivery courier delivering an order to a customer.

33. The computer readable medium of claim 25 further comprising computer program code for printing a receipt at the customer delivery stop using the mobile computing device.

34. The computer readable medium of claim 32 wherein the receipt being printed is an updated receipt for the at least one customer based on the updated customer billing data.

35. The computer readable medium of claim 25 wherein the customer delivery data being displayed on the display includes a notification to the delivery courier to check an identification.

36. The computer readable medium of claim 25 wherein the customer-delivery data being displayed on the display includes a notification to the delivery courier to capture a customer signature.

37. A computer readable medium as recited In claim 25,
wherein the customer delivery data includes an identification check required indication if the at least one ordered Item of the at least one customer order requires an identification check, and
wherein said computer readable medium further comprises computer program code for informing the delivery courier, via the mobile computing device, that an identification check regarding proof of age is to be performed before delivery of the at least one customer order is completed if the customer delivery data includes the Identification check required indication.

38. The computer readable medium of claim 37 wherein, based on the customer delivery data, said computer program code for displaying at least a portion of the customer delivery data comprises notifying the delivery courier when the at least one customer order being delivered requires successful completion of the identification check in order for the at least one customer to receive the at least one ordered item from the at least one customer order.

39. The computer readable medium of claim 38 wherein the at least one ordered item includes al least one restricted item.

40. The computer readable medium of claim 37 further comprising computer program code for informing the delivery courier via the mobile computing device that a customer signature is to be captured, the customer signature acknowledging delivery of the at least one customer order to the at least one customer.

41. The computer readable medium of claim 40 further comprising computer program code for capturing the customer signature using the mobile computing device, and computer program code for recording a time related to the customer signature captured.

42. The computer readable medium of claim 37 further comprising:
computer program code for processing, at the mobile computing device, a customer return of the at least one ordered item of the at least one customer order when the at least one customer is not able to provide adequate proof of age.

43. A computer readable medium as recited in claim 27, wherein the updated customer billing data reflects a current balance due on the at least one customer's account following the adjustment transaction.

* * * * *

UNITED STATES PATENT AND TRADEMARK OFFICE
CERTIFICATE OF CORRECTION

PATENT NO. : 7,792,712 B2   Page 1 of 3
APPLICATION NO. : 11/244627
DATED : September 7, 2010
INVENTOR(S) : Kantarjiev et al.

It is certified that error appears in the above-identified patent and that said Letters Patent is hereby corrected as shown below:

On the Title Page:
On page 3, Item (56) References Cited U.S. Patent Documents:

"2002/0010633 A1    1/2002 Brotherson" should be --2002/0010633 A1    1/2002 Brotherston--

"2002/0194084 A1    12/2002 Suries" should be --2002/0194084 A1    12/2002 Surles--

On Page 4, Item (56) Other Publications:

"Imposing an Objective Viewpoint," Modem Purchasing, vol. 38, Iss. 3, March 1994, pp. 1-4." should be --Imposing an Objective Viewpoint," Modern Purchasing, vol. 36, Iss. 3, March 1994, pp. 1-4.--

"Dialog Examiner's search re: U.S. Appl. No. 11/244,627, dated Nov. 24, 2009, 2 pages." should be --Dialog Examiner's search re: U.S. Appl. No. 11/244,627, dated Sep. 24, 2009, 2 pages.--

"Dialog Examiner's search re: U.S. Appl. No. 11/244,627, dated Nov. 24, 2009, 13 pages." should be --Dialog Examiner's search re: U.S. Appl. No. 11/244,627, dated Sep. 24, 2009, 13 pages.--

"Complaint for Patent infringement, Case 1:09-cv-06870, flied Oct 30, 2009, pp. 1-5." should be --Complaint for Patent Infringement, Case 1:09-cv-06870, filed Oct 30, 2009, pp. 1-5.--

"Answer to Complaint with Affirmative Defenses and Counterclaims, Case 1:09-cv-08870, filed Dec. 23, 2009, pp. 1-9." should be --Answer to Complaint with Affirmative Defenses and Counterclaims, Case 1:09-cv-06870, filed Dec. 23, 2009, pp. 1-9.--

"Notice of Allowance for U.S. Appl. No. 09/568,572, dated Oct. 6, 2004." should be --Notice of Allowance for U.S. Appl. No. 09/568,572, dated Oct. 8, 2004.--

In the Specification:
Column 10, line 26 "or example" should be --for example--.

Signed and Sealed this

Twenty-third Day of November, 2010

David J. Kappos
*Director of the United States Patent and Trademark Office*

Column 19, lines 59-60 (claim 2, lines 2-3) "down-load" should be --downloading--.

Column 20, line 54 (claim 14, line 3) "or more" should be --one or more--.

Column 21, line 33 (claim 20, line 16) "program" should be --programming--.

Column 21, line 34 (claim 20, line 17) "display:" should be --display;--.

Column 21, line 50 (claim 22, line 3) "program" should be --programming--.

Column 21, line 52 (claim 22, line 5) "Is" should be --is--.

Column 21, line 61 (claim 23, line 7) "device," should be --device.--.

Column 21, line 66 (claim 24, line 5) "Include" should be --include--.

Column 22, line 2 (claim 25, line 2) "program stored" should be --program code stored--.

Column 22, line 12 (claim 25, line 12) "Including" should be --including--.

Column 22, line 13 (claim 25, line 13) "order Information" should be --order information--.

Column 22, line 31 (claim 26, line 2) "a server.computing" should be --server computing--.

Column 22, line 44 (claim 27, line 2) "order Information" should be --order information--.

Column 22, line 46 (claim 28, line 1) "medium" should be --storage medium--.

Column 22, line 49 (claim 29, line 1) "medium" should be --storage medium--.

Column 22, line 56 (claim 30, line 1) "medium" should be --storage medium--.

Column 22, line 60 (claim 31, line 1) "medium" should be --storage medium--.

Column 22, line 64 (claim 32, line 1) "medium" should be --storage medium--.

Column 23, line 1 (claim 33, line 1) "medium" should be --storage medium--.

Column 23, line 5 (claim 34, line 1) "medium" should be --storage medium--.

Column 23, line 8 (claim 35, line 1) "medium" should be --storage medium--.

Column 23, line 12 (claim 36, line 1) "medium" should be --storage medium--.

Column 23, line 13 (claim 36, line 2) "customer-delivery" should be --customer delivery--.

Column 23, line 16 (claim 37, line 1) "medium" should be --storage medium--.

Column 23, line 19 (claim 37, line 4) "Item" should be --item--.

Column 23, line 21 (claim 37, line 6) "medium" should be --storage medium--.

Column 23, line 27 (claim 37, line 12) "Identification" should be --identification--.

Column 23, line 28 (claim 38, line 1) "medium" should be --storage medium--.

Column 24, line 5 (claim 39, line 1) "medium" should be --storage medium--.

Column 24, line 6 (claim 39, line 2) "includes al least" should be --includes at least--.

Column 24, line 8 (claim 40, line 1) "medium" should be --storage medium--.

Column 24, line 14 (claim 41, line 1) "medium" should be --storage medium--.

Column 24, line 19 (claim 42, line 1) "medium" should be --storage medium--.

Column 24, line 26 (claim 43, line 1) "medium" should be --storage medium--.

Column 24, line 26 (claim 43, line 1) "in claim 27," should be --in claim 25,--.